United States Patent [19]
Ripplinger

[11] Patent Number: 5,660,354
[45] Date of Patent: Aug. 26, 1997

[54] MATING SPOOL ASSEMBLIES FOR REDUCING STRESS CONCENTRATIONS

[76] Inventor: C. Robert Ripplinger, 66 E. 100 North, Millville, Utah 84326

[21] Appl. No.: 384,760

[22] Filed: Feb. 7, 1995

Related U.S. Application Data

[62] Division of Ser. No. 147,138, Nov. 3, 1993, Pat. No. 5,464,171.

[51] Int. Cl.$^6$ ............................ B65H 75/14; B65H 75/18
[52] U.S. Cl. ................................... 242/608; 242/118.61
[58] Field of Search ................................. 342/608, 608.6, 342/607.7, 608.8, 118.61, 608.3, 118.6, 118.62

[56] References Cited

U.S. PATENT DOCUMENTS

| | | | |
|---|---|---|---|
| 382,091 | 5/1888 | Kelsea | 242/609.1 |
| 671,446 | 4/1901 | Lorscheider | 242/608.7 |
| 1,270,614 | 6/1918 | Harmon | 242/608 |
| 1,410,014 | 3/1922 | Hurlburt | 242/609 |
| 1,566,788 | 12/1925 | Clark | 242/118.61 |
| 1,811,517 | 6/1931 | Mossberg | 242/608.8 |
| 2,059,709 | 11/1936 | Rueger | 242/608.7 |
| 2,193,158 | 3/1940 | Bezanson | 242/123 |
| 2,626,764 | 1/1953 | Dunlap | 242/118.61 |
| 2,643,830 | 6/1953 | Paeplow et al. | 242/118.61 |
| 2,911,163 | 11/1959 | Warrick | |
| 3,284,021 | 11/1966 | Ryll et al. | 242/608.3 |
| 3,323,743 | 6/1967 | Landgraf | 242/68.3 |
| 3,552,677 | 1/1971 | Hacker | 242/118.61 |
| 3,757,626 | 9/1973 | Kulp | 83/542 |
| 3,817,475 | 6/1974 | Goldstein | 242/115 |
| 3,854,509 | 12/1974 | Bailey | 242/86.5 R |
| 3,861,606 | 1/1975 | Loquineau et al. | 242/18 DD |
| 3,966,139 | 6/1976 | Terpak | 242/118 |
| 4,128,215 | 12/1978 | Underwood | 242/608.6 |
| 4,184,650 | 1/1980 | Nelson et al. | |
| 4,244,535 | 1/1981 | Moodie | |
| 4,252,587 | 2/1981 | Harden et al. | 156/73.5 |
| 4,512,361 | 4/1985 | Tisbo et al. | 137/355.27 |
| 4,726,534 | 2/1988 | Chenoweth | |
| 4,976,475 | 12/1990 | Bjorkqvist | 242/115 |
| 4,997,142 | 3/1991 | Grant | 242/118.4 |
| 5,137,204 | 8/1992 | Compagnucci | 228/173.4 |
| 5,143,316 | 9/1992 | Goetz et al. | 242/129.5 |
| 5,203,516 | 4/1993 | Donaldson | |
| 5,236,145 | 8/1993 | Floury et al. | 242/808 X |
| 5,265,821 | 11/1993 | Takatori | |

FOREIGN PATENT DOCUMENTS

| 558182 | 6/1957 | France | 242/118.6 |
|---|---|---|---|

OTHER PUBLICATIONS

Table of Contents and Advertisements of the Directory of Wire Companies of North America, 1991 Edition, advertisement for Carris Reels, Inc. and the Bridge Mfg. Co., Inc., Sonoco Products Co., Carlton Manufacturing Co., Crellin, Inc. and Mossberg Industries, Inc., (6 pages) published by Business Informations Services, Inc.

Primary Examiner—Daniel P. Stodola
Assistant Examiner—Emmanuel M. Marcelo
Attorney, Agent, or Firm—Broadbent, Hulse, Pierce & Pate

[57] ABSTRACT

A plastic spool for receiving, storing and dispensing wire and cable is formed of multiple pieces. A preferred design is assembled in two halves, each having a tube portion and a flange portion. The tube portions have stepped, mating diameters. The tube portion of one half is stepped on the inside diameter and the tube portion of the other half is stepped on the outside diameter to match. The spool may be assembled in three pieces. The halves or pieces may be bonded together, such as by spin welding, hot plate welding, ultrasonic welding or induction welding. In some embodiments, the pieces may be fastened mechanically. Larger spools, usually referred to as reels may be configured to receive a tube into a channel formed in each flange. The channel wall may extend outboard of the inside flange wall, permitting a penetrating fastener to secure the tube to the channel wall without making any blemish or bump which might damage wire in the wrapping region around the tube between the flanges.

24 Claims, 16 Drawing Sheets

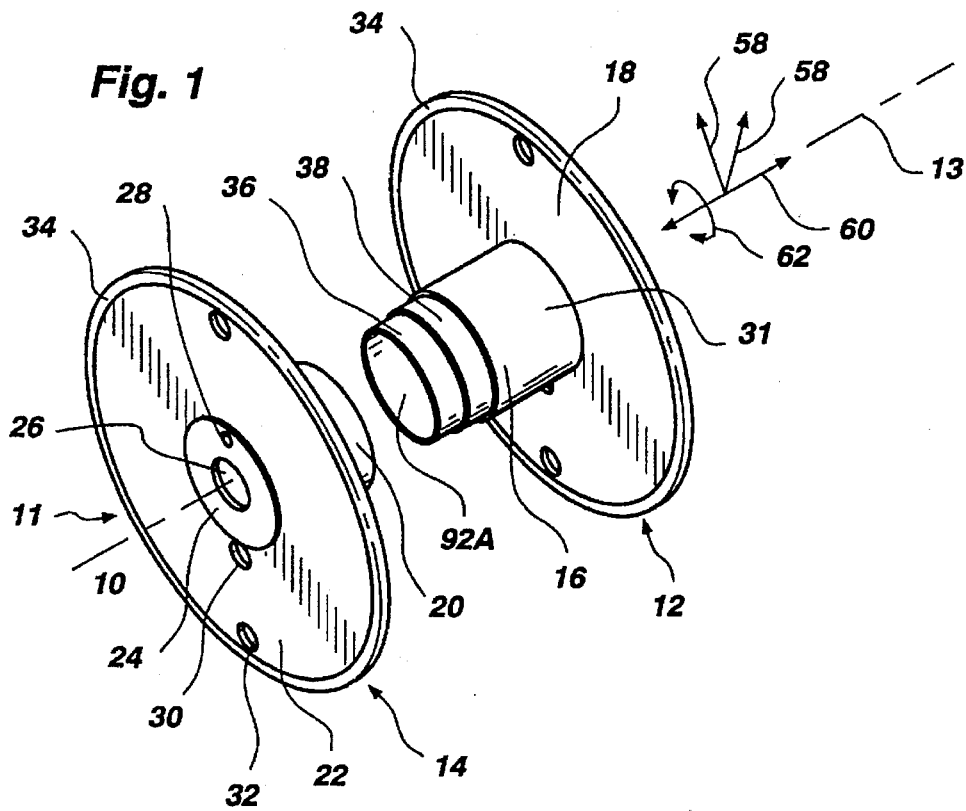
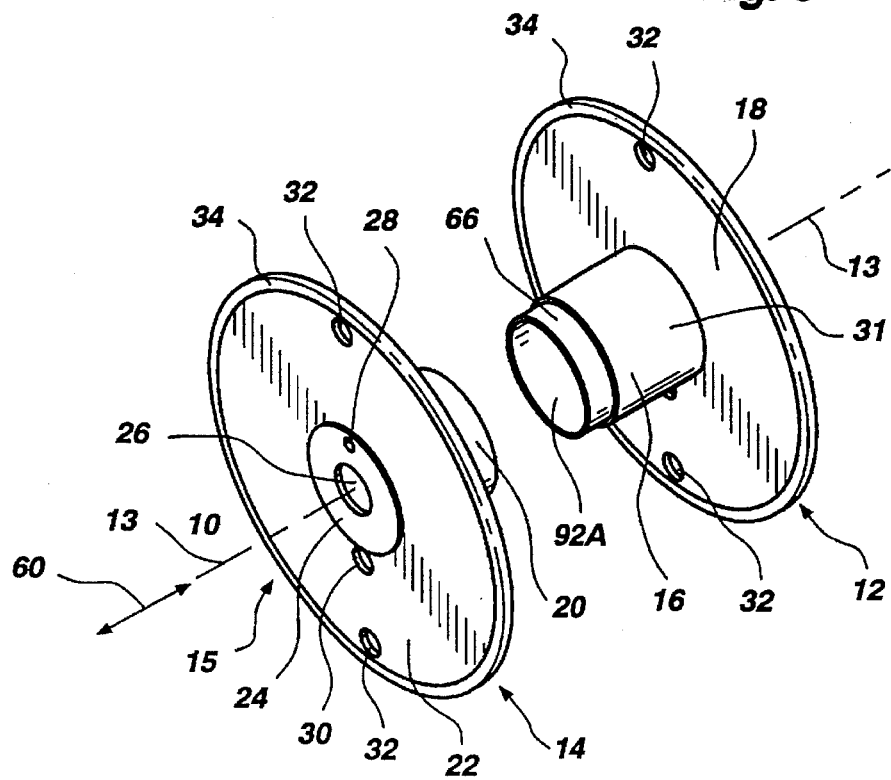

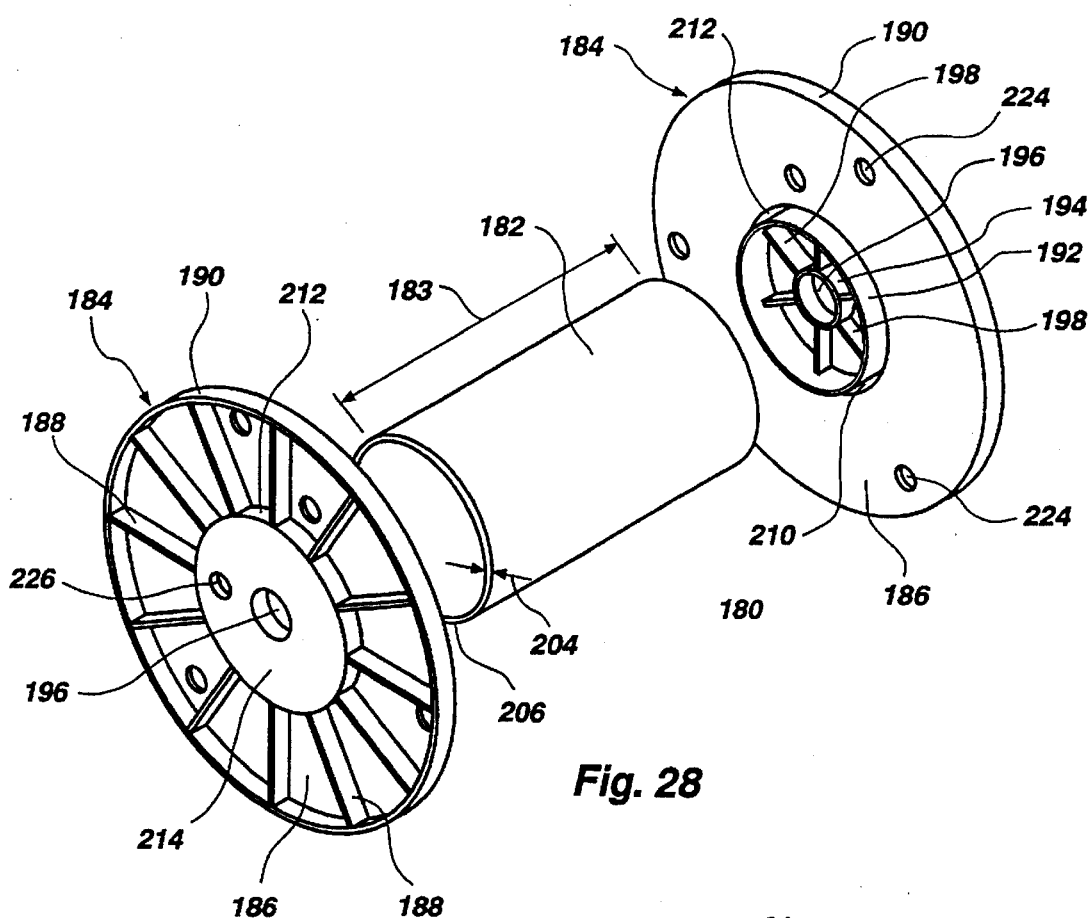
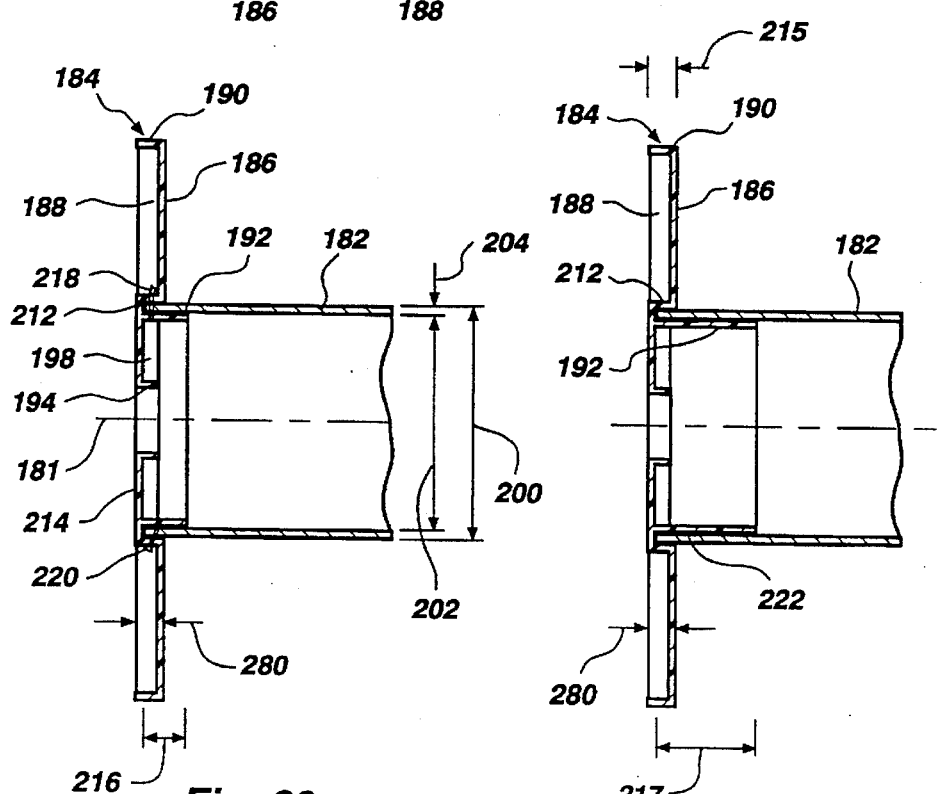
Fig. 28
Fig. 29        Fig. 30

MATING SPOOL ASSEMBLIES FOR REDUCING STRESS CONCENTRATIONS

RELATED APPLICATIONS

This application is a divisional application of the application Ser. No. 08/147,138, filed Nov. 3, 1993, for a Mating Spool Assembly, now U.S. Pat. No. 5,464,171.

BACKGROUND OF THE INVENTION

1. Field of the Invention

The invention pertains to manufacture of spools and reels generally, and more particularly to plastic spools and reels for receiving electrical wire and cable during manufacture and for subsequent handling, storage and dispensing thereof.

2. State of the Art

Stranded materials, upon manufacture, are typically taken up directly onto a reel or spool. The take-up spool or reel receives the strand directly from the last step in the manufacturing process. Thereafter, the filled spool is effective for storage and handling purposes. Upon sale or distribution, the spool is often placed on an arbor, either alone or with other spools, for convenient dispensing of the linear or stranded material. Linear or stranded materials include electrical wire whether in single or multiple strands and cable (comprised of multiple wires), rope, wire rope, hose, tubing, chain and plastic and rubber profile material (generally any polymeric or elastomeric extruded flexible material). In general, a host of elongate materials as diverse as pharmaceutical unit dose packages, fiberoptic line and log chains are stored on spools. Likewise, ribbon, thread and other stranded materials are wrapped on spools.

The requirement for a spool in the manufacture and handling of wire is substantially different than spools in the textile industry. For example, the weight of wire is several times the weight of thread or rope. The bulk of wire, which translates to the inverse of density, is substantially lower for wire than for hose, tubing or even chain.

Meanwhile, most spools are typically launched on a one way trip. The collection and recycling of spools is hardly worth the effort, considering that their materials are not easily recyclable.

In the art, a typical spool has a tube portion extending between two flange portions positioned at either end of the tube portion. For example, one tube has a standard 2-inch outside diameter piece while the flanges conventionally have a 6½-inch outside diameter. Typically, a spool has a rounded rim or rolled edge at the outermost diameter. This rim serves structural as well as aesthetic and safety purposes. Spools may be manufactured in a variety of tube lengths and thus are typically manufactured as three-piece units. That is, the tube is a molded, or preferably extruded, piece. The tube can be cut to length from standard extruded stock. Each flange has an insertion portion, which is fitted inside one end of the tube and there bonded.

As a result of the requirement for bonding, most. plastic spools known in the art are manufactured of polystyrene or acrylonitrile-butadiene-styrene (ABS). Although the impact performance of styrene is rather poor, ABS is substantially better. A variety of well known solvents can be used to bond styrene-based polymers. Also given the structural and cost requirements, the amount of plastic in a spool dictates inexpensive styrene-based plastics.

Olefinic plastics, including polyethylene, polymethylpentene, polybutadiene, polypropylene and the like cannot be bonded with solvents. As a result, the multipiece spools known in the art do not use polyolefins, also called olefinic plastics, olefin polymers or polyolefins.

A spool of wire 6½-inches in diameter may weigh twenty pounds. A spool or reel 12 inches in diameter may weigh over a hundred pounds. The impact load of a twenty-pound spool of wire dropping from a bench or other work surface to a floor in a manufacturing environment (a common form of drop test or impact test) is sufficient to fracture the spool in any of several places, releasing the wire in a tangled, useless mass.

Spools may break at the corner where the tube portion meets the flange portion or may fracture at an engagement portion along the tube portion. Three-piece spools typically break near the corner between the flange and the tube portion where a joint bonds the tube portion to the flange portion.

Because multi-piece spools often break at the joints, applicant developed the two-piece polystyrene spool having a two-inch outside diameter for the tube and a ½ inch engagement length on a single step. The step is formed on each mating half of the spool, each half comprising a flange on a tube portion. The step is essentially formed with a right angle shoulder. Each of the edges on the inside and outside right angles forming the axial ends of the step is broken. A broken edge indicates that the burr is removed from exterior corners of tooling and the internal corners are chamfered slightly to prevent a burr on a finished part. A broken edge is cut approximately 0.005 inches on an edge of the chamfer or fillet as appropriate.

Each step, male and female, has a wall thickness of half the thickness of the wall thickness of the tube. The two-piece spool employs a first half comprising a flange portion and a tube portion assembled with a second half comprising a second flange portion and a second tube portion. The first half is made to receive the second half along an engagement area. A step on the male half of the spool and a step inside the female half of the spool allow a matched fit which can be solidly bonded. The joint is typically located such that the break in the outside surface appears at the middle of the resulting tube length. The joint is thus located at a maximum distance from the flange.

A three-piece spool is the industry standard for spools of 6½ -inch diameter. The typical length of the engagement portion on each end is approximately one eighth to one quarter of an inch. Nevertheless, the two-piece spools having half-inch engagement length still experience some breakage during drop tests when manufactured in styrene or styrene-based plastics such as ABS.

Polyolefins are very tough materials. Tough means that a material can tolerate a relatively large amount of straining or stretching before rupture. By contrast, a material which is not tough will usually fracture rather than stretch extensively. As a result, when a reel of wire is dropped (a standard drop test or impact test), the energy of impact breaks the spool. Polyolefins, by contrast, may actually be drawn past yielding into their plastic elongation region on a stress-strain chart. Polyolefins thus elongate a substantial distance. The result is that olefinic plastics will absorb a tremendous amount of energy locally without rupture. Thus, the wire on a spool which has been dropped does not become a tangled mat of loops.

Given their toughness, olefinic parts will bend, strain, distort, but usually not break. Nevertheless, olefinic plastics are not typical in the art of wire spools. Polyolefin parts are not bonded into multi-piece spools, however. Lack of a solvent is one problem, lack of a durable adhesive is another. Therefore, any spool would have to be manufactured as unit of a specific size. The inventory management problem created by unique spools of various sizes is untenable. Although the cost of some olefinic resins is lower than that of styrene-based resins. Moreover, the cycle time of molds directly related to material properties is usually much faster for styrene-based resins. The designs available use wall thicknesses which result in warpage as well. All these factors and more combine to leave olefinic resins largely unused in the spool industry, as is the design of bonded parts for spools from olefinic resins.

What is needed is a small diameter (typically 6½-inch outside diameter) plastic spool, which can tolerate the energy of being dropped (drop tested) when fully wrapped with wire. In addition, even in the standard styrene-based plastic spools, a better tube design than the single step type is desired. In drop tests, a spool may be dropped axially, radially or canted off-axis. In a radial drop, spools that break typically fail near the middle of the length of the tube. In axial drops, flanges may separate from tubes in failed spools. In an off-axis drop, flanges typically fracture.

Large spools are typically called reels in the wire industry. Heavy-duty reels of 12 inches in diameter and greater (6 feet and 8 feet are common) are often made of wood or metal. Plastic spools of 12-inch diameter and greater are rare and tend to be very complex. The rationale is simple. Inexpensive plastics are not sufficiently strong to tolerate even ordinary use with such a large mass of wire or cable wrapped around the spool.

Moreover, large flanges for reels are very difficult to manufacture. Likewise, the additional manufacturing cost of large spools is problematic. High speed molding requires quick removal after a short cycle time. Flanges are typically manufactured to have very thick walls. Increased thicknesses directly lengthen cycle times. Thus designs do not scale up. Therefore, the flanges have very slow cooling times and molding machines have low productivity in producing them.

Styrene plastic is degraded by recycling. That is, once styrene has been injection molded, the mechanical properties of the resulting plastic are degraded. Thus, if a spool is recycled, ground up into chunks or beads and re-extruded as part of another batch, the degradation in quality can be substantial. Olefinic plastics improve over styrene-based plastics in that olefinic plastics can be completely recyclable. The mechanical properties of an olefinic plastic are virtually identical for reground stock as for virgin stock.

In reels, a 12-inch diameter unit is instructive. Such a spool is usually manufactured of wood. Nevertheless, a plastic spool in 12-inch diameter may also be manufactured with a pair of plastic flanges holding a layered cardboard (paperboard) tube detained therebetween. The flanges are typically bolted together axially to hold the tube within or without a circumferential detent as with wooden reels.

The reels have an additional difficulty when they are dropped during use or a testing equivalent. The flanges do not stay secured. One difficulty with the structural integrity of the three-piece reel design is that the tube is not fastened to the flange. The flange and tube are often precarious wooden assemblies held together by three or more axial bolts compressing the flanges together. The tube is prone to slip with respect to the flanges, breaking, tilting or otherwise losing its integrity under excessive loads. Such loads result from the impact of dropping onto a floor from a bench height or less. For the largest reels, rolling over or into obstacles or from decks during handling is more likely to be the cause of damage.

Very large cables, having an outside diameter up to several inches is taken up during manufacturing on a very large reel, from two feet to eight feet in diameter. The current state of the art dictates wooden reels comprised of flanges capturing a barrel-like tube of longitudinal slats therebetween. The two flanges are held together by a plurality of long bolts extending therethrough. Wooden reels are not typically recyclable. A splinter or blemish in a reel can damage insulation on new cable or wire wrapped therearound at the manufacturing plant. Damaged insulation destroys much of the value of a reel of cable or wire. That is, the wire must be spliced, or may have damage extending over several wrapped layers of wire. Splices segmenting the original length of wire wrapped on the reel add costs in labor, reliability, service and the like.

Wood cannot be recycled and reconstructed cost effectively. In addition, the plurality of bolts and nails must be removed with other related metal hardware. The reels do not effectively burn without the labor investment of this dismantling operation.

Also, a wooden reel that is slightly out of adjustment, damaged, or broken, is problematic. A broken reel leaves a large area splintered to damage wire insulation. A reel which is loose will tilt and twist as the slats shift with respect to the flanges.

Steel reels tend to be more frequently recyclable. However, each must be returned in its original form to be reused. Thus, the bulk of transfer is as large as the bulk of original shipment, although the weight is less. Also, steel is heavy, subject to damage by the environment such as by stains, rust, peeling of paint, denting, accumulation of coatings or creation of small burrs on surfaces and corners. For example, when a reel is rolled over a hard surface, sharp objects, grit or rocks tend to raise small burrs of the outer edge of the flange. Similarly, contact with any sharp or hard object can raise burrs on the inside surfaces of the flanges.

As with wooden reels, only to a greater extent, a burr on a steel reel tends to act like a knife, slicing through insulation and ruining wire. Perhaps the most difficult aspect of burrs is that they are hardly detectable at sizes which are nevertheless highly damaging to insulation. Of course the weight and cost of steel reels is another factor in the difficulty of employing them for delivery of cable.

What is needed in large reels of from a foot to eight feet approximately in outside flange diameter is a reel which is dimensionally stable, maintains structural integrity in service and during accidental dropping, which will not fracture or separate at a flange if it is dropped, and which is economically recyclable. In a large reel, on the order of two to eight feet in diameter, what is needed is a lightweight, high-strength reel. The reel should not tend to damage wire when scratched, gouged, or otherwise having a burr raised on any key surface. Similarly, a large reel should be resilient enough that it does not maintain a permanent set, such as a steel reel will, when damaged. A plastic reel should be formed of a material which is tough. The material should be flexible enough that a burr will not damage insulation. Finally, a large reel should be recyclable. Recycling is most efficient if a reel can be reground near the site of use. Empty reels are more voluminous than they are heavy.

SUMMARY OF THE INVENTION

The invention solves this multiplicity of problems with plastic spools and reels formed in a multi-piece structure preferably by molding from olefinic plastics. Some of the designs may be manufactured in styrene-based plastics, but the design are particularly well adapted to manufacture using molded polyethylene and polypropylene or similar olefinic plastics.

The structures and methods of the invention apply to spools and reels of all sizes. Notwithstanding a structure which can be injection molded in a 6½-inch flange diameter my have to be roto-molded (tumble-molded) in an eight foot size, the invention applies. Similarly, notwithstanding a hot-air welding technique may be more cost-effective than spin-welding large reels, the structures of the invention apply. Likewise, notwithstanding that ribs may need to be wider or longer or spaced somewhat differently, the structures of the invention typically apply to all sizes of spools.

The invention, in one embodiment, comprises a two-piece spool formed of two mated halves joined in an engagement region near the center of the tubular portion of the spool. The mated parts fit one inside the other at the tube portions leaving a smooth outer surface on the tube. The tube portions are bonded at the diameters of two engagement surfaces formed as stepped, tubular sections.

In an alternate embodiment, the mated tubular sections are comprised of mated cones which intimately contact along their surfaces where they are bonded to one another. In another alternate embodiment, the engagement portion is comprised of mated cylindrical sleeves fitted one inside the other and each involving a single step from the nominal inside and outside diameters, respectively, of the tubular portion of the respective halves of the unassembled spool. In this embodiment, the engagement portion extends a width greater than one quarter of the diameter of the spool for a proper bearing surface for carrying loads. This structure is improved also by forming the radial plane of the joints carefully. Typically the visible joint on the outer diameter of the tube is located at the middle of the tube between the flanges, the location called the midline or midplane, as opposed to the axial centerline through the tube.

To overcome the break in the outside surface at the outermost fiber of the material, and to reduce stress concentrations, the single-step spool is made by offsetting the joint axially away from the midline or midplane of the tube between the flanges. To a certain extent, additional length is helpful, but especially so with the other modifications herein described. Also, radiused corners at the junction of each shoulder and step surface are used, even including radii as large as the full wall thickness of a step, that is, the shoulder's radial dimension. Likewise, a clearance on the inside abutting shoulders is used to assure a full butt joint at the outside diameter of the tube. A tapered step, resulting in two conical surfaces, one on the male part and one on the female part, registered at a leading and trailing shoulder to ensure proper length between the flanges, is an ideal connection scheme. With properly radiused corners at all shoulders, this construction can be made to give a nearly seamless strength, virtually equivalent to a tube having no joint.

In yet another embodiment of the spool, a flange portion is manufactured having a stub of a tube protruding from one side. A tube, manufactured by either extrusion or molding is formed to have an inside diameter to mate with a step on the stub of the flange. A flange is placed on one end of the tubular center member (tube) and a second flange is placed on the opposite end of the tubular center member. In the preferred embodiment, an engagement portion on the stub of the flange is formed to mate at two diameters with the engagement portion of the tubular member which is also stepped for a mated fit over the stub.

In the preferred embodiment of the spool in larger sizes, intermediate sized reels (on the order of 12 inches to 2 feet outside flange diameter) are comprised of a tube or central portion manufactured of wound, layered paperboard or from a polymer tube. Under some circumstances, the central tube may be manufactured of a thin-walled, rolled, steel or sheet metal tube. A good choice is extruded plastic tube.

In the preferred embodiment of the invention, a channel is formed to extend axially outboard of an inner face of the principal wall of flange. The channel is formed between an internal support sleeve fitted to the inside surface of the tube and a channel wall, an inside rim on the flange, formed to fit around the outer diameter of the tube at one end. The flange also has an outer rim protruding axially outward, normal to the wall or face of the flange. The outer rim is positioned at the outermost diameter of the flange for adding structural strength and rigidity.

The inner rim is accessible from the axially outboard end of the reel for radial penetration of a fastener through the inner rim, and through the tube. In the preferred embodiment, a fastener penetrates not only the inner rim and tube, but also the support sleeve interior to the tube, thus sandwiching the tube for additional structural strength. In one embodiment, the inner rim has splines formed along the inside diameter thereof and running axially therealong for providing improved gripping of the tube between the support sleeve and the splines. In an alternate embodiment, the splines are positioned on the support sleeve to contact the inside surface of the tube. However, since tubes are typically formed on a mandrel, the inside diameter is more precise, so splines are more useful on the outside diameter where fit is likely to be poorer. By the same token, a plastic tube is usually extruded and thus has a more precise outside diameter. Thus, splines on the inside (around the support sleeve) would be preferred in such a configuration.

In an alternate embodiment, the inner rim has conduits formed therein, each having an internal aperture for receiving a pin to force the tube outwardly toward the inner rim. In the preferred embodiment, the pins have a barbed edge in contact with the inside surface of the tube, carrying the pins. In an alternate embodiment, a barb is formed on the support sleeve itself to protrude slightly outwardly therefrom for engaging the inner surface of the tube or for engaging a hole formed or drilled radially through the tube at the proper location to engage the barb.

As with the splines, the barbs fitted to mathing holes in the tube are preferably placed to contact the tube surface which is most precisely and repeatedly located. Thus, in the case of cardboard tubes, barbs preferably engage holes on the inside diameter, while barbs would preferably engage holes in the outside diameter of extruded plastic tubes. Nevertheless, if barbs do not engage holes, but simply depress the surface of the tube, then barbs tend to serve the fitting functions of splines as well as the holding function. In such configurations, the barbs would preferably be located on a flange to engage the least precise surface of the tube.

In one embodiment, an inner core or supporting sleeve on the flange protrudes into the tube. The supporting sleeve may be made as the inside wall of a channel or may extend directly into a tube, the tube having its ends abutted directly against the respective faces of each flange. A fastener penetrates the tube and anchors the tube onto the supporting sleeve. A tape or other covering is usually placed over the fastener to prevent any sharp edges or bumps from damaging the insulation of the wire wrapped around the tube in service.

In the preferred embodiment of all reels, the walls are formed by thin-walled molding processes. Thin-walled molding produces a wall, web, or rim which has a thickness on the order of half an order of magnitude smaller than the height thereof. That is, for a rib height of approximately one-half inch, a rib thickness of between 1/20th and 1/5th of an inch would be a thin wall. Flanges of the spools and of the reels are formed to have reinforcing ribs manufactured with thin-walled technology.

An additional aspect of the invention is the bonding technology used. In all spools and reels wherein the tube is formed of a polymer, the bonding is by a cohesive bonding technique Using the base material without a solvent. That is, ultrasonic welding, spin welding, hot plate welding, hot air welding and inductive (inductance) welding are used to bond the circumferencial surfaces of the steps together or to bond the axial faces which form the shoulders of each step together, or both. For all styrene-based plastics, the bonding methods include solvent-based adhesives, with or without filler materials.

A spool comprises a first portion for receiving an elongate material wrapped therearound. In the preferred embodiment, the first portion is mated along at least two diameters inside a second portion for retaining the elongate material on the first portion. An additional engagement length greater than one quarter of a tube diameter has been found to greatly improve breakage rates. In an alternate embodiment, the first portion is mated at a single diameter to the second portion. However, in this configuration, the engagement length should be greater than half the tube diameter. Moreover, to function as desired, the engagement should include a butt joint of the end of the female part at the shoulder of the male part to prevent any break in the outermost surface of the tube. Likewise, the shoulders of the female steps are preferably radiused at a radius equal to the thickness of the step. The radius has a value of at least 0.015 inches, but is preferably between 50 and 100 percent of the shoulder height at the radiused step.

The first portion is comprised of a tubular portion for holding the elongate material wrapped therearound and a flange portion for retaining the elongate material on the tubular portion. The second portion is comprised of a tubular portion for holding an elongate material wrapped therearound and a flange portion for retaining the elongate material thereon.

A two-piece spool is formed in two parts in which each piece or part includes a flange and a tubular portion that fits a mated portion of the tubular portion of the opposite piece to form a central tube of the spool.

In one embodiment, a conical surface of the first portion and a conical surface of the second portion are bonded along a surface of intimate contact. In another embodiment, the two tubular portions of the respective first and second portions are mated together on each of two mutual cylindrical surfaces having different diameters. The mated surface is the surface where two surfaces, a surface from each of two pieced, come together.

One embodiment employs a single step. Mated parts of the tubular portion of each first and second portion have a step width in excess of one quarter of the outside diameter of the tubular portion. However, in the preferred embodiment, surfaces on at least two steps (having two diameters other than the principal inner and outer diameters of the tube) are formed in the tubular portion of each first and second portion. The surfaces of mated steps are engaged in intimate contact.

A step, as the term is used herein is a distinct wall portion of a tubular member having an inner and outer diameter and a length. A shoulder is a planar annulus normal to the longitudinal axis of the tubular member having an inner and outer diameter. A step surface has a diameter and a length, being normal to a radius of the tubular member.

In another embodiment, the spool further includes a third portion attached to an end of the second portion opposite the first portion for retaining the elongate material between the first portion and the third portion. In another embodiment, it is the third portion which is attached to an end of the first portion opposite the second portion for retaining an elongate material between the second portion and the third portion. This just allows for mating in either direction. That is, either the first or second portion can be the male or female part molded in the female or male half of the mold, respectively.

In one embodiment, the spool comprises a first member having a proximal end and a distal end. The first member comprises a first tubular portion at the distal end for holding a strand of material wrapped thereon and a first flange portion connected to the proximal end of the first tubular portion for retaining the strand of material on the first tubular portion.

The first tubular portion comprises a first wall having a first inside surface and extending longitudinally from the distal end of the second member toward the proximal end thereof to a point proximate a first longitudinal position. A second wall has a second inside surface and extends longitudinally away from a point proximate the first position to a second position. A third wall has a third inside surface and extends from proximate the second position to a third position proximate the proximal end of the first member.

A second member mates to the first member and has a proximal end and a distal end. The second member comprises a second tubular portion at a proximal end thereof for holding a strand of material thereon and a second flange portion connected to the distal end of the second tubular portion for retaining the strand of material on the second tubular portion. The second tubular portion comprises a cylinder having a variety of wall thicknesses creating surfaces to mate with the first tubular portion. A first step having a first outside diameter is fitted to the second inside surface and is substantially longitudinally coextensive therewith. A second step has a second outside diameter fitted to the first inside surface and is substantially longitudinally coextensive therewith. An outer surface has a third outside diameter and extends from proximate the second step to the second flange proximate the distal end of the second tubular member.

In one preferred embodiment, the first member and the second member are both molded of an olefinic plastic. Olefinic plastics include polyethylene and polypropylene. The olefinic plastics have excellent toughness. In one embodiment the first and second members of olefinic plastic are bonded together.

The current state of the spool assembly art employs solvent bonding using a glue which may be an adhesive in its own right, but which principally contains a solvent for softening the styrene-based plastics. Upon evaporation of the solvent, the softened parts bond at the points of contact. The preferred method of manufacturing the spool of the invention comprises the steps of molding a first part from an olefinic plastic material, molding a second part from an olefinic plastic material and then bonding the first part to the second part. Bonding may include ultrasonic welding, hot plate welding or spin welding the first part to the second part. Spin welding is a preferred method. Induction welding is also possible. These methods will be discussed in some detail herein.

Molding involves injecting an olefinic plastic resin into a mold and waiting for the resin to solidify. The method of the invention requires less than 120 seconds of waiting before opening the mold. The part is preferably removed immediately upon opening of the mold. Parts can be made properly according to the invention by waiting for less than 60 seconds, and in some embodiments, less than 15 seconds before opening the mold. In one method of the invention, the entire cycle time from mold opening until mold opening is only 12 seconds. The method requires a design having thin walls and a cooled mold having high thermal conductivity and a liquid cooling system to cool areas enclosing a comparatively larger mass of resin.

A spool comprises a first part formed of an olefinic plastic for receiving a stranded material wrapped therearound. A second part is formed of an olefinic plastic and bonded to the first part for retaining the stranded material on the first part. In one embodiment, the first part is further comprised of a first tubular portion and a first flange portion. The second part is comprised of a second tubular portion and a second flanged portion. A surface of the first tube portion is bonded proximate one end of the first tube to a surface of the second tube portion proximate one end of the second tube portion. In an alternate embodiment, the first part is a tubular member and the second part includes a flange. A third part includes a flange and is attached to one end of the tubular first part. The third part is attached at the end of the tube opposite the second part.

The first flange portion of a spool may further comprise ribs for stiffening the first flange portion. Likewise, the second flange portion further preferably comprises ribs for stiffening the second flange portion.

In larger sizes, spools having a flange diameter greater than or equal to 12 inches are called reels. A reel for receiving an elongate strand of material comprises a tube for receiving an elongate strand wrapped therearound. A first flange is formed to hold one end of the tube. A second flange is formed to hold the other end of the tube. The first flange comprises a first wall substantially normal to a longitudinal axis along the tube for retaining the elongate strand on the tube. The first wall has an inner face and an outer face. A second wall extends behind or outside the first flange away from the outer face in a longitudinal (axial) direction. The second wall intersects the first wall substantially normal thereto and surrounds the tube for securing the tube from moving relative to the first wall. A fastener is preferably secured to penetrate through the second wall in the tube to secure the tube thereto.

The reel may include splines attached to an inside surface of the second wall for applying force to the tube by contacting the tube. The first flange further comprises an end wall connected to the first wall, parallel thereto and spaced away therefrom. A support sleeve extends from the end wall into the tube at the one end for supporting the tube. The second flange likewise comprises an equivalent end wall and a second support sleeve extending into the tube at the other end for supporting the tube.

In an alternate embodiment, securement means may be connected to the support sleeve and the second support sleeve for fastening the tube to the first and second flanges respectively. The securement means may include a barbed surface. For example, a barbed pin can be used for engaging the tube at an inside surface thereof. Also, a barbed finger for engaging the tube may be attached to the tubular member associated with flange, and holes formed in the tube receive and retain the barb.

As discussed above, the splines and barbs not fitted to holes are preferably positioned to contact the tube on the side of the wall having the least precision of manufacture. For wrapped paper tubes, the inside surface of the tube is most precise. For extruded plastic tubes, the outside surface is most precise. Barbs fitted to holes in the tube are preferably positioned to engage the more precise surface.

The first flange preferably comprises ribs attached at inner edges thereof to a plate to extend between an inner rim and an outer rim. The inner rim and the outer rim extend away from the plate to a distance outside the ribs. This configuration protects a label attached to the outer edges of the ribs, since the label is not exposed to wear from contacting other objects.

A strand is a segment of material having a very long aspect in one direction compared to two other aspects of approximately the same order of magnitude. For example, the string in a roll or ball of string has a diameter which is many orders of magnitude less than its length. The ribbon on a roll or reel may have a thickness and width within one or two orders of magnitude of each other while the length is many orders of magnitude larger than either. Likewise, a stock of electrical wire, electrical cable, rope, wire rope, chain, tubular stock, plastic profile material or the like wrapped around a roll, spool or reel will usually have several orders of magnitude difference between the smallest aspect (thickness) and the largest aspect (length).

Mated parts are parts which fit one inside the other with an inside surface of the one part in intimate contact with an outside surface of the other part by gluing, melting, bonding, slip fit, interference fit, mechanical detents or the like. For example, the double-stepped outside diameters of one tube portion fit into the double-stepped inside diameters of the other tube portion. A first surface of an inner step fits inside a first surface of an outer step in intimate contact at their one mutual diameter within manufacturing practice and tolerances. Meanwhile, a second surface of a second step fits inside a second surface of a second wall in intimate contact at their other mutual diameter. Likewise, two mated parts may be bonded together along the mated conical surfaces of each. The two surfaces are in intimate contact, the contact extending between a first and second diameter continuously.

Ribs are not simply bosses having a height of less than the order of magnitude of the web thickness of a flange. Rather, ribs have an aspect ratio of height to thickness on the order of approximately five. In the preferred embodiment of a 12-inch reel, thin ribs having a thickness of 0.1 inches have a height of 0.5 inches from the Surface extend away at right angles to the surface of the member that they stiffen. In the preferred embodiment of a 6½-inch spool, the ribs on the flange have a thickness of 0.05 inches and a height of 0.25 inches approximately.

As a practical matter, all webs in a flange preferably have the same thickness. Thus, the rib, the underlying flange wall stiffened by the rib, and the rim running along the circumference of the flange all typically have the same thickness. Although different thickness may be preferred for structural optimization, manufacturing considerations such as cycle time optimization dictate uniform thicknesses throughout.

Barbs are ramp-shaped members such as notched brads, pins, sleeves, or fingers. One surface slopes away from a longitudinal axis through the elongate pin, brad, sleeve or finger and then suddenly, precipitously angles back toward the axis. Thus, a tooth-like barb may be a hook-like finger in which the protruding "barb" sinks into the wound paperboard tube. Such a finger may be laterally depressed during insertion into a paperboard tube or a plastic tube, springing back into a pocket or hole in the wall of the tube to form a locking mechanism. The barb may be relatively stiff or rigid, holding the tube by friction or localized depression or by localized gouging.

In one embodiment, the flange is made of a plate or wall positioned normal to the axis of the tube. On one side of the plate, an inner face of the plate faces the tube, while an outer face is on an opposite side of the plate. An inner rim extends in a circular cross section from the plate and may itself terminate in a back plate at an edge of the rim spaced away from the plate in either longitudinal direction along the axis. The ribs extend parallel to the axis a distance away from the plate. An outer rim is attached to the plate at its outermost diameter. Thus the ribs extend between the inner rim and the outer rim and extend away from the plate.

In one embodiment, the height of the ribs away from the plate is less than the heights of the inner rim and the outer rim, which are preferably equal. In this manner, a recessed area exists below the inner and outer rims for receiving a label glued to the ribs. In stacking and handling, the label on the spool or reel will not be damaged but will remain readable.

BRIEF DESCRIPTION OF THE DRAWINGS

FIG. 1 is an isometric view of the two halves of the two-step spool of the invention before assembly.

FIG. 3 is an isometric view of the two halves of the single-step spool of the invention before assembly.

FIG. 28 is an isometric view of an unassembled reel of the invention.

FIGS. 29–30 are partial cross-sectional views of the reel of FIG. 28.

DETAILED DESCRIPTION OF THE DRAWINGS

Figure 2:
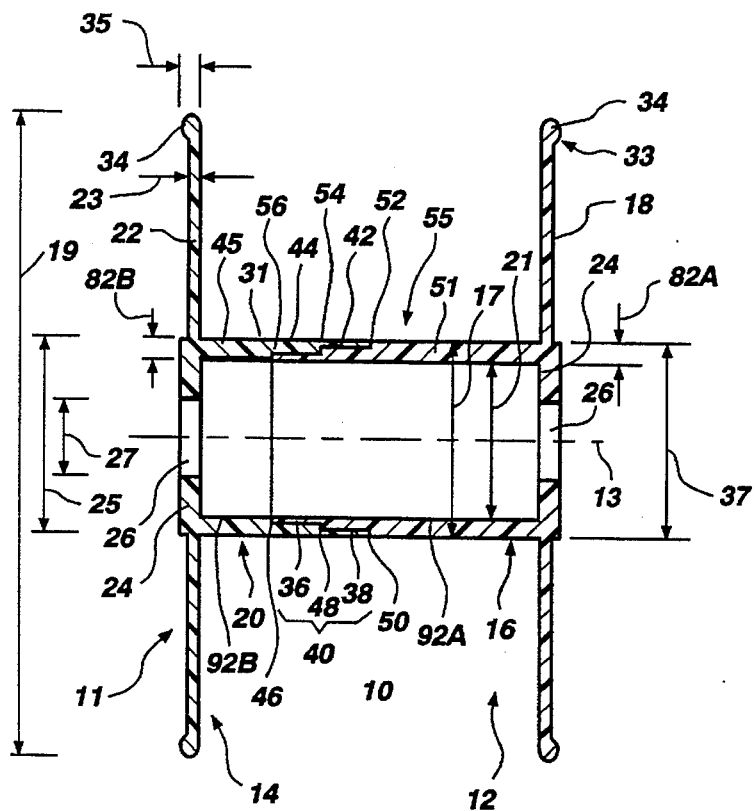
FIG. 2. is a cross-sectional elevation view of two-step spool of FIG. 1.

The invention is best understood by reference to FIGS. 1–4. A spool 10 is formed as a multi-step spool 11 having an insert 12 and a receiver 14. In an alternate embodiment, a single step spool 15 is contemplated.

In the invention, an insert tube 16 having a tube outside diameter 17 is one of two molded portions which will form the spool 10. At a distal end of the insert tube 16, an insert flange 18 is integrally molded to the insert tube 16 to extend to a flange diameter 19. Opposite the insert tube 16 is mated a receiver tube 20 having a tube inside diameter 21 formed therein. The receiver tube 20 is integrally attached to a receiver flange 22 defined by a thickness 23 and the flange diameter 19. Together, when assembled, the insert tube 16 and the receiver tube 20 form the tube 29 of the spool 10. The resulting outside surface 31 of the tube 29 smoothly transitions between the two component tubes, insert tube 16 and receiver tube 20.

A hub 24 is formed proximate the center of the receiver flange 22 and insert flange 18. The hub is defined by a hub diameter 25 and an arbor aperture 26 having an arbor diameter 27. In addition, a hub penetration 28 is formed through the hub 24 for purposes of inserting a rotating driver dog or pawl (not shown) from the rotating machine on which the spool 10 is fitted to take up wire.

An inner penetration 30 is formed in the insert flange 18, with a corresponding inner penetration 30 formed in the receiver flange 22. The inner penetration 30 is used to secure the first end of the cable or wire to the spool 10 at the start of the wrapping operation. Likewise, an outer hole 32 may be formed in the insert flange 18 and receiver flange 22 for purposes of indexing, driving, handling or inspection and for tying the trailing end of the material strand (cable or wire) to the spool 10 after the wrapping operation.

A rim 34 formed to have an approximately circular cross section of rim diameter 35 is formed at the edge 33 of each of the flanges 18, 22. The rim 34 functions to improve the stiffness of each of the flanges 18, 22 and provides a more robust bearing surface for resting the spool 10 on a supporting surface.

Figure 4:
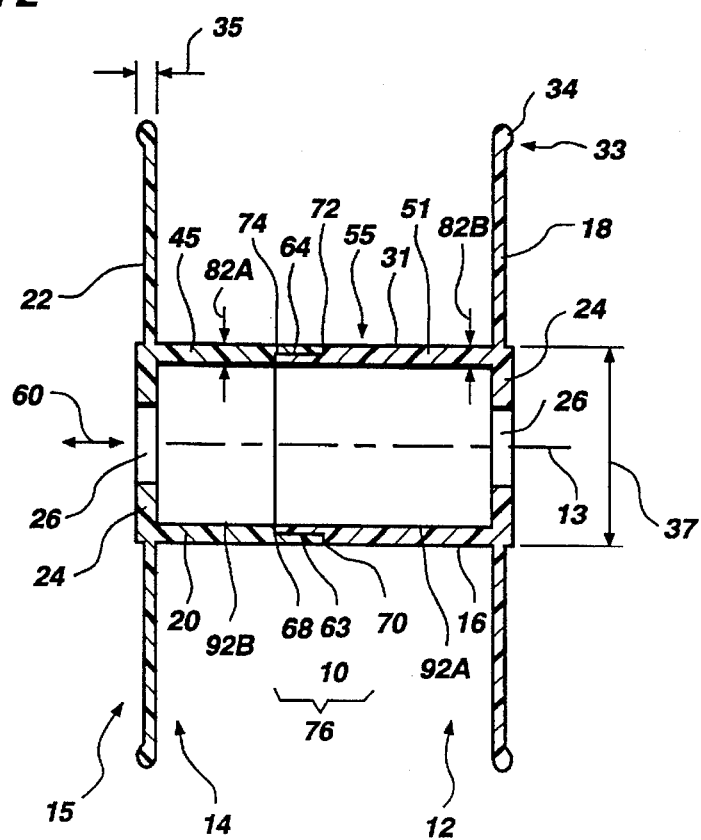
FIG. 4 is a cross-sectional elevation view of the single-step spool of FIG. 4.
Figure 5:
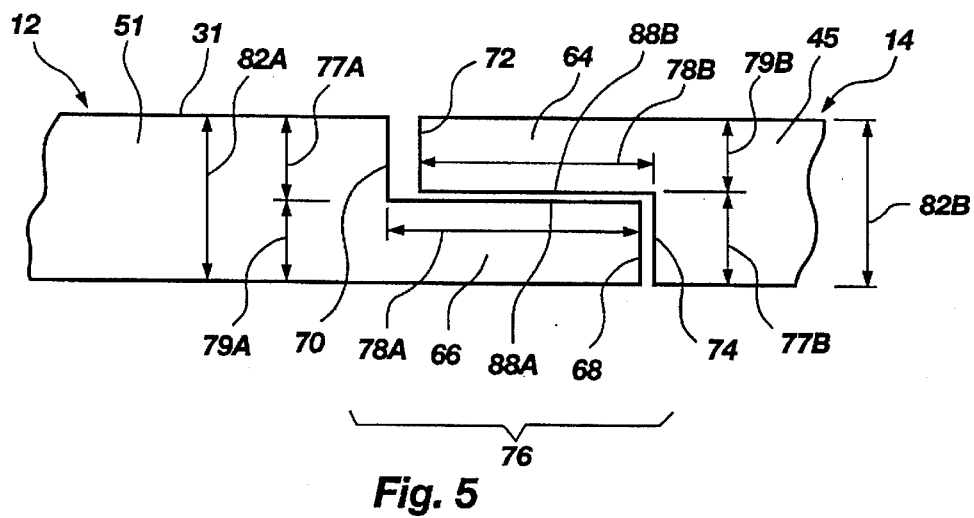
FIG. 5 is a partial, detailed, cross-sectional view of the engagement region of the tubular members of the single step spool of the invention.
Figure 6:
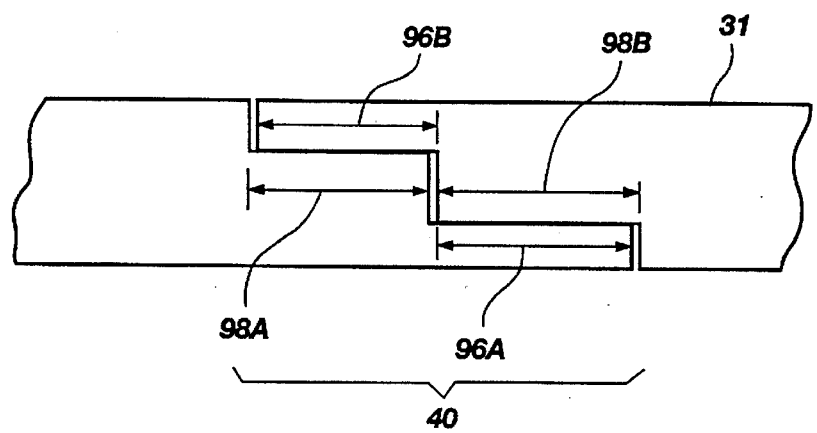
FIGS. 6–7 are partial, detailed, cross-sectional views of the engagement region of the tubular members of the two-step spool of the invention.
Figure 7:
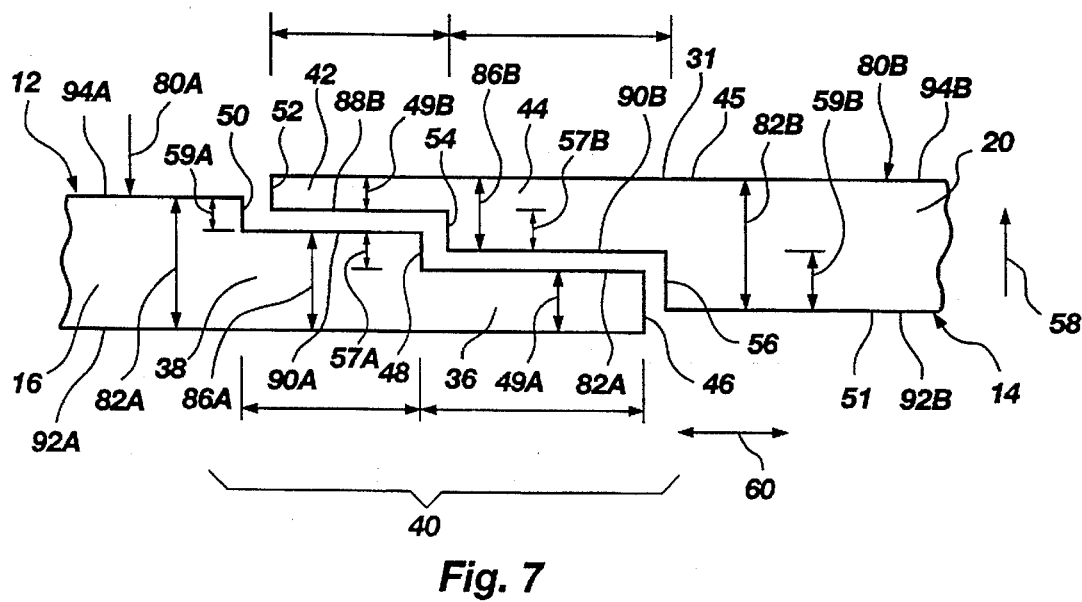

The attachment of the insert 12 to the receiver 14 is best understood by reference to FIGS. 5–7 as well as FIGS. 1–4. The insert tube 16 is formed as part of the insert 12. The insert 12 comprises a portion of the spool 10 and includes a first inner step 36 and a second inner step 38 extending axially along an engagement region 40. Fittedly matched to the insert tube 16 is the receiver tube 20 comprising a first outer step 42 and a second outer step 44 formed within the outer wall 45.

The insert 12 is staggered along a first insert shoulder 46 and a second insert shoulder 48, as well as a third insert shoulder 50, preferably formed to be approximately planar, normal to the axis 13 of the spool 10. Each of the shoulders 46, 48, 50 extends in a radial direction 58.

For clarity, the insert wall 51 refers to the wall of the insert tube 16 and the receiver wall 45 refers to the wall of the receiver tube 20, having inside surfaces 92A, 92B, respectively. However, the walls 51, 45 after bonding, become the wall 53 of the bonded tube 29.

Each of the shoulders 52, 54, 56 is thus perpendicular (normal) to an axial direction 60. Due to the angular nature of the insert tube 16 and the receiver tube 20, the preferred embodiment employs steps 36, 38 which run continuously in the circumferential direction 62 in a completely circular configuration.

Mated to the first inner step 36 and second inner step 38 are the second outer step 44 and first outer step 42 respectively. That is, the first outer step 42 and the first inner step 36 are positioned at the extreme ends of their respective receiver tube 20 and insert tube 16.

In an alternate embodiment, a single outer step 64 is mated to a single inner step 66, while a first insert shoulder 68 and a second insert shoulder 70 abut a second receiver shoulder 74 and a first receiver shoulder 72, respectively. An engagement region 76 includes the step widths 78A, 78B formed along the tube walls 51, 45 of the insert 12 and the receiver 14, respectively, in the embodiment of FIGS. 3–5. FIGS. 19A–19E are variations on the embodiment of FIG. 5, while FIGS. 17A–18B are more substantial variations of the embodiment of FIG. 5.

In the preferred embodiment, the step widths 78A, 78B exceed one half of the tube outside diameter 17. In alternate embodiments, other features allow a reduction in the step widths 78A, 78B. The wall thicknesses 82A, 82B are preferably equal and have a value of approximately 0.105 inches. In the spool 11, the steps 42, 44, 45 vary by approximately 0.035 inches radially from each other. In the spool 15, the steps 64, 45 vary from one another by approximately 0.052 inches radially.

Meanwhile, the preferred dimensions for the first receiver shoulder 72 and the second receiver shoulder 74 are approximately equal to those for the second insert shoulder 70 and first insert shoulder 68, respectively. Each of the shoulders, 68, 74, have matched (within tolerances etc.) shoulder heights 79A, 77B, respectively, as the shoulders 70, 72 have matched shoulder heights 77A, 79B. The shoulder heights 77A, 77B, 79A, 79B each preferably extend in a radially direction 58 approximately half the wall thickness 82A, 82B of the respective tube walls 51, 45 (see FIG. 5.). However, the shoulder heights 79A, 79B need not be equal, nor need the shoulder heights 77A, 77B be equal.

The step width 78A is matched to the step width 78B of the receiver tube 20. Matched means approximately equal within manufacturing processes and tolerances. An additional thickness or offset (generally called a land or boss) may be developed for purposes of bonding.

In the preferred embodiment, the wall thicknesses 82A, 82B of the insert 12 and receiver 14 at the insert tube 16 and receiver tube 20 are thus equal. The first step thickness 84A is not necessarily equal to the first step thickness 84B on the receiver tube 20. Similarly, the second step thickness 86A is not necessarily equal to the second step thickness 86B. The heights 49A, 57A, and 59A of the shoulders 46, 48 and 50 must be equal to the heights 59B, 57B, and 49B of the shoulders 56, 54 and 52, respectively, within manufacturing practice as to tolerance, interferences and the like required for assembly and mounting.

The result is that the first step surface 88A is bonded in intimate contact with the second step surface 90B while the first step surface 88B is bonded in intimate contact with the second step surface 90A of the insert. The inside surfaces 92A and 92B of the insert 12 and receiver 14 are not critical.

On the contrary, the outside surfaces 94A and 94B of the insert tube and receiver 14, respectively, are very important. As a practical matter, no embodiment or method should leave any flash outside the outside surfaces 94A and 94B. This will become more evident as the welding techniques are discussed.

One critical aspect of the invention, shown in FIG. 6 is the dimensioning of the first step width 96A which is co-extensive with the second step width 98B as the first step width 96B is co-extensive with the second step width 98A. These step widths 96A, 96B and 98A, 98B are matched and mated surfaces engaging the insert 12 and the receiver 14 at the insert tube 16 and the receiver tube 20. The dimensions may be slip-fit, interference-fit or may be a slip-fit with some raised pattern on either or both mating surfaces. The fit is extremely important for the various welding techniques which include ultrasonic welding, spin welding, hot plate welding and induction welding. Solvent bonding is another alternative, but is not a preferred alternative since the preferred material for the spools 10 is plastic from the olefin group including polyethylene and polypropelene. Bonding of olefinic plastics must be cohesive, melting the base material locally to form a bond.

The bonding processes are best understood by reference to FIGS. 8–16. Although illustrating a single step, each process is preferably used to bond every step in an engagement region 40, 76.

Figure 8:
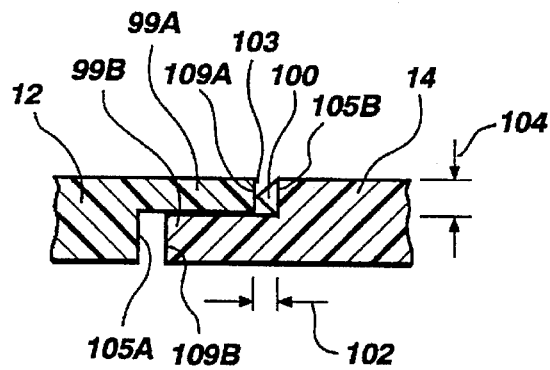
FIG. 8 is a partial, detailed, cross-sectional view of matching steps of the invention configured for bonding by ultrasonic welding.
Figure 9A:
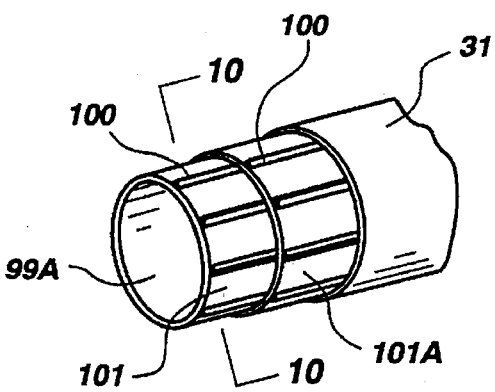
FIGS. 9A and 9B are partial perspective views of the steps of a tubular portion of a spool of the invention configured for bonding by ultrasonic welding.
Figure 9B:
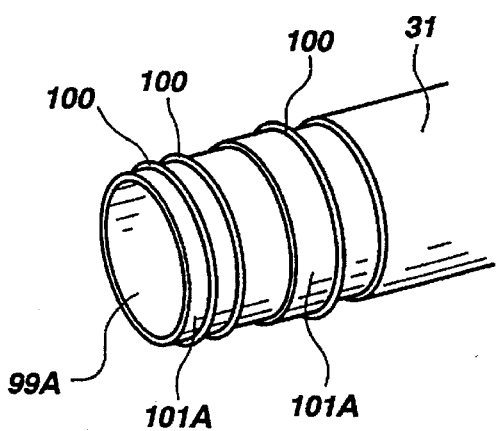
Figure 10:
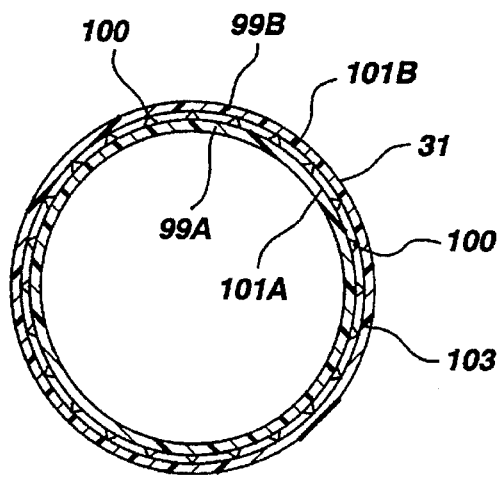
FIG. 10 is a cross-sectional end elevation view of the assembled engagement region of the tube of FIG. 9A showing energy directors running axially between the step surfaces

Ultrasonic welding as shown in FIGS. 8, 9A, 9B and 10 is accomplished by forming on an inner step or outer step 99A, 99B a energy director 100. The energy director 100 is attached to a surface 101A or 101B to extend away therefrom a height 102 as shown in FIGS. 8–10. The height 102 is dictated to a certain extent by the width 104 so that the point 103 of the energy director 100 forms a right angle. In the embodiment shown in FIG. 8, the energy director 100 is located to run cicumferentially around the shoulder 105B of the receiver 14.

Multiple energy directors 100 may be used on any surface. In the alternative, the energy director 100 can be formed to extend axially along a step surface 90A, 90B, 88A, 88B as illustrated generally by the surface 101 of FIGS. 9A–10. That is, the energy director 100 may be placed on a female or male surface 101A, 101B on the inner step 99A of the insert 12 or on the outer step 99B of the receiver 14, respectively.

In the preferred embodiment, the energy director 100 has a height 102 measuring approximately 0.015 inches and a width 104 of approximately 0.030 inches. Ultrasonic welding is accomplished by holding the insert tube 16 together in a mated fashion with the receiver tube 20 while applying pressure and ultrasonic energy. Each is preferably applied in the same direction, either axially at the insert flange 18 and receiver flange 22 or radially at the engagement region 40, 76.

Figure 11:
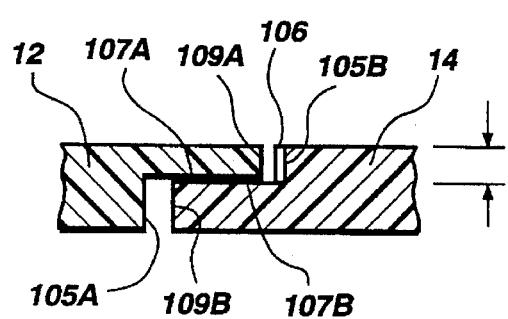
FIGS. 11–12 are a partial, detailed, cross-sectional views of matching steps of the invention configured for bonding by spin welding.
Figure 12:
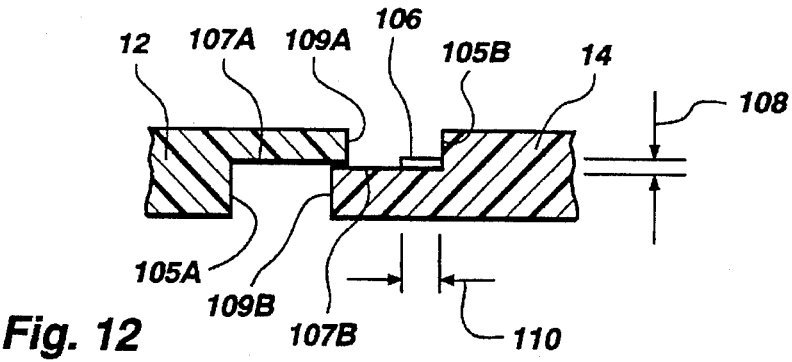

In an alternate welding method, the receiver tube 20 may be bonded to the insert tube 16 by spin welding. In FIGS. 11 and 12, the boss 106 is formed either on a step surface 107A, 107B or else on a shoulder surface 105A, 105B, 109A, 109B. The boss 106 is raised a thickness 108 from the surface 105A, 105B, 107A, 107B, 109A, 109B to which it is formed. The parts are bonded by spinning insert tube 16 with respect to the receiver tube 20 while pressing the insert tube 16 and receiver tube 20 together. The resulting friction melts the boss 106 to form a cohesive bond between the materials of the insert tube 16 and receiver tube 20. When the spinning stops, the parts cool and the melted material in the engagement region 40, 76 solidifies under pressure.

In the preferred embodiment, the thickness 108 should be approximately 0.02 inches for a snugly fitted pair of parts. That is, the actual interference should be approximately 0.02 inches. The width 110 of the boss 106 is at least 0.02 inches, and is preferably 0.10 inches in a tube 29 having a 2-inch outside diameter 37. As a general proposition, a thickness of the boss 106 should be between approximately 2% and 20% of the wall thickness 263 of a tube 29, with 10% being preferable. In the embodiment of FIG. 12, the width 110 might conceivably run across the entire underlying surface 107B. The axial and circumferential orientations of the energy directors 100 of FIGS. 9A, 9B and 10 could also be applied to the bosses 106 with the appropriate dimensions above for spin welding of the embodiment of FIG. 12.

Figure 13:
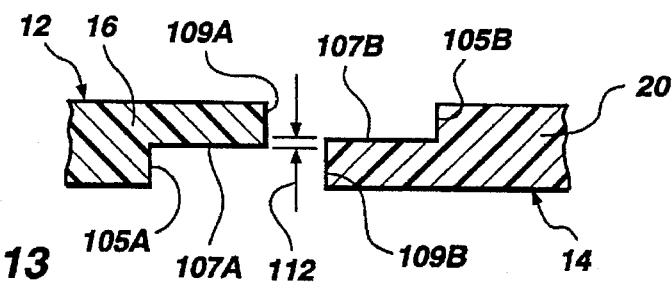
FIG. 13 is a partial, detailed, cross-sectional view of matching steps of the invention configured for bonding by hot plate welding.

FIG. 13 shows an embodiment suitable for hot plate welding. In hot plate welding, surfaces 107A, 107B are held lightly against heated metal surfaces (not shown) until the plastic begins to flow at the surface of the heated metal. The surfaces 107A, 107B are quickly moved parallel to one another in an axial direction, and held under axial pressure. Any flash which results is left to remain inside the inside surface 92A, 92B (see FIG. 7). The step surfaces 107A, 107B are formed to have an interference 112 of approximately 0.030 inches. When the insert 12 is pushed under load into the receiver 14, the interference 112 is eliminated as a cohesive bond is formed between the surfaces 107A, 107B. In the preferred embodiment, the shoulder 105A abuts the shoulder 109B while the shoulder 105B abuts the shoulder 109A.

Figure 14:
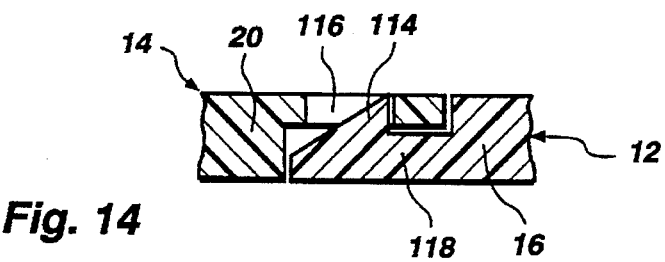
FIGS. 14–15 are partial, detailed, cross-sectional views of barbs to be added to the matching steps of the invention for mechanically securing the tubular members together.
Figure 15:
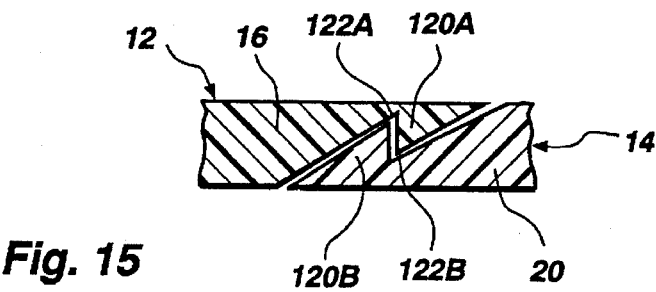

In the embodiments in FIGS. 14 and 15, a mechanical, quasi-removable connection is made by relying on a barb 114 in an aperture 116. The barb 114 is cantilevered away from the receiver tube 20 on the arm or finger 118 snapping clear of the receiver tube 20 into the aperture 116. Such a mechanical connection as shown in FIG. 14 may be made reversible (removable) with proper tooling, but represents a secure manufacturing approach regardless. A number of barbs 114 are distributed around the circumferential direction 62 of the insert tube 16 and are matched with apertures 116 formed at corresponding cicumferential locations in the receiver tube 20. In all configurations using barbs 114, a barb 114 can be positioned on the opposite part from that shown, the mating part, while the aperture 116 is formed in place of the barb 114 shown.

The embodiment of FIG. 15 similarly uses a pair of barb-like ridges 120A, 120B which are forced to fit within matching recesses 122B, 122A, respectively. Each of the ridges 120A, 120B is either continuous or interrupted around the circumferential direction 62 of the insert tube 16 and receiver tube 20.

Figure 16:
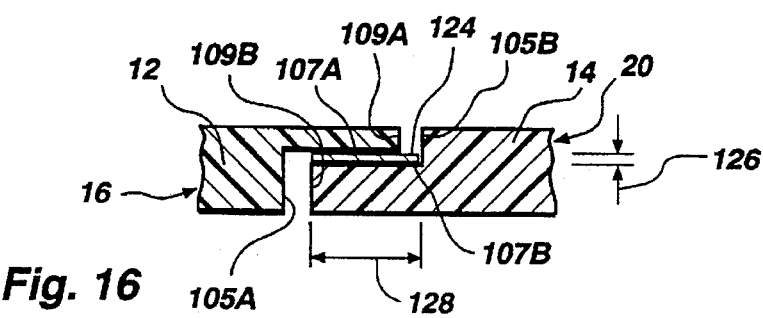
FIG. 16 is a partial, detailed, cross-sectional view of matching steps of the invention configured for bonding by induction welding.
Figure 17A:
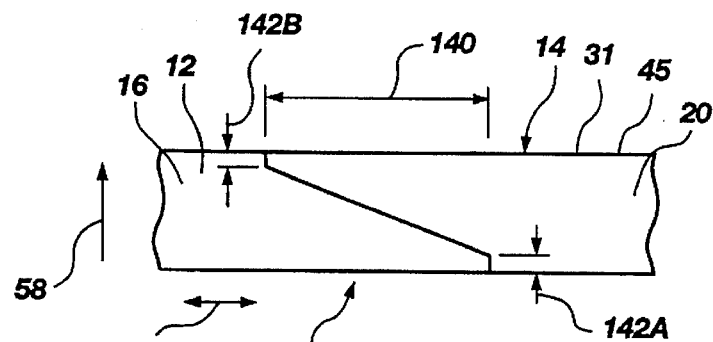
FIGS. 17A, 17B are a partial, detailed, cross-sectional views of matching conical steps of the invention configured for bonding assembled and unassembled, respectively.
Figure 17B:
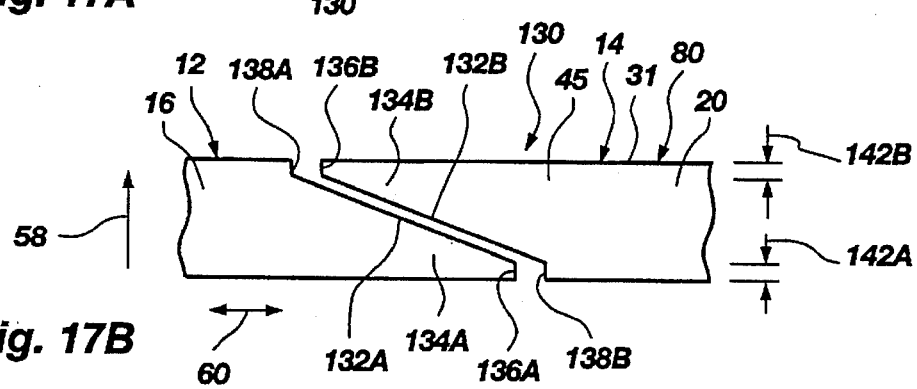

FIG. 16 shows a layer 124 of an electromagnetic thermoplastic compound placed on the step surface 107B of the receiver tube 20 for induction welding. The layer 124 may be in the form of a paste, tape, molded shape, or extruded sleeve. The layer 124 is comprised of a material which will produce eddy currents and associated eddy current heating when placed in an inductive field. For example, iron oxide powder or metallic particles may be used. Bonding is accomplished by assembling the insert tube 16 and receiver tube 20 and placing the engagement region 40 (see FIG. 2) in an inductive field. Upon creation of the inductive field, the layer 124 builds up heat from the eddy currents within it, melting nearby material to form a bond when cooled. The material of the insert tube 16 and the material of the receiver tube 20 and the layer bond together, typically.

The layer 124 has a thickness 126 of approximately 0.0005–0.020 inches and a width 128 covering the underlying surface 107B. Of course, the layer 124 may be applied to the corresponding surface 107A of the insert tube 16, but that approach is not preferred as it may blemish the spool. Likewise, in this configuration, a tolerance suitable to receive the layer 124 must be formed between the step surfaces 107A, 107B.

Yet another alternate embodiment of the invention, includes a tapered joint 130 as shown in FIGS. 17A–18B wherein a tapered surface 132A is mated with a tapered surface 132B. A tapered step 134A, 134B is thus created on the insert tube 16 and the receiver tube 20, respectively. The leading shoulders 136A, 136B are formed to avoid the problems of registration of the insert tube 16 and receiver tube 20 axially and to prevent the difficulties inherent in sharp corners. Similarly, the trailing shoulders 138A, 138B are formed to fit against the leading shoulders 136B, 136A, respectively. The engagement length 140 is preferably about one inch in accordance with the previous embodiments. The shoulder height 142A, 142B is preferably approximately 0.015 inches. The tapered joint configuration of FIGS. 17A–18B can be bonded by any of the methods discussed above.

Figure 18A:
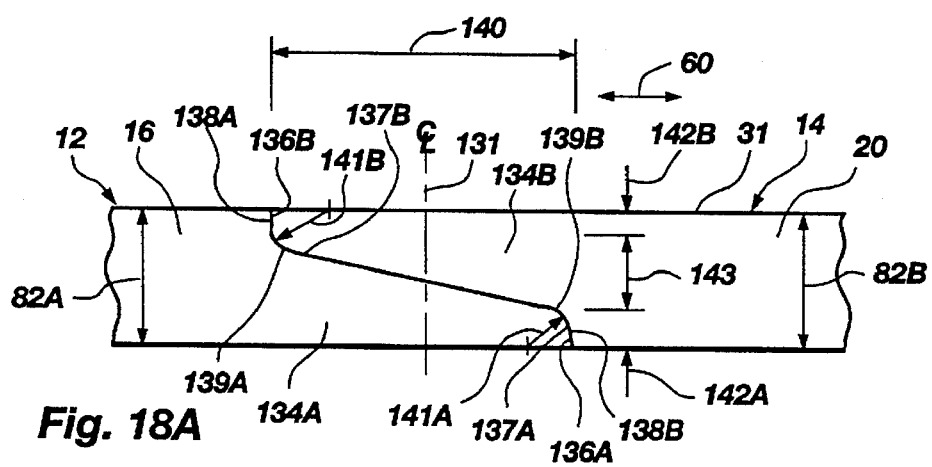
FIGS. 18A and 18B are cross-sectional side views of the engagement region in an alternate embodiment of a joint using matching conical steps.
Figure 18B:
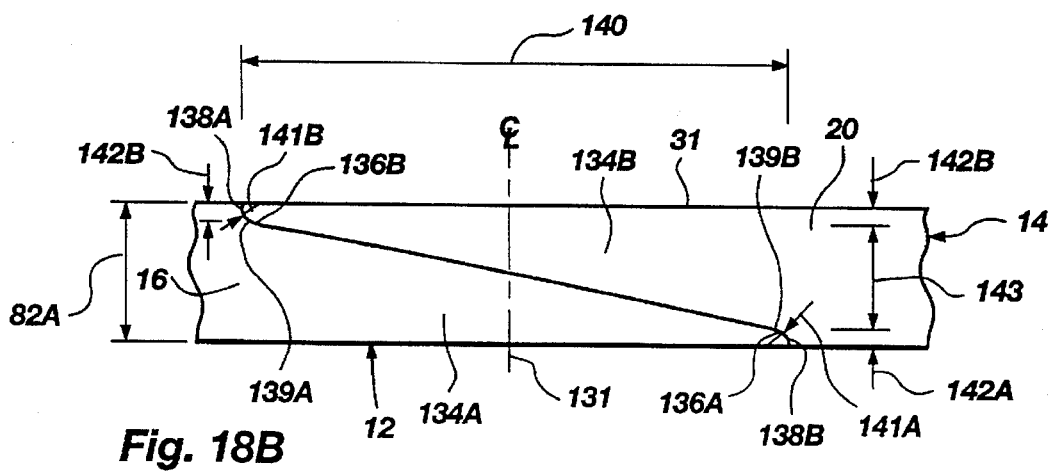

In addition, several improvements on a single step spool design are illustrated in FIGS. 18A–19E. In the embodiments of FIGS. 18A, 18B the tapered steps 134A, 134B are fitted together as discussed above, but include the radii 141A and 141B at the interfaces between the leading shoulder 136A and trailing shoulder 138B and between the leading shoulder 136A and trailing shoulder 138A, respectively. The result is an elimination of the sharp corner that results from merely breaking an edge as discussed above. Instead the stress concentration inherent in sharp corners is gone. The engagement length 140 should typically be at least one tenth of the tube outside diameter 17 (FIGS. 1–4) but preferably is over one fifth, although it may be less in very large spools 10 and reels 180. In FIG. 18B a very small radius 141A, 141B is used on the radiused corners 137A, 137B, whereas in the configuration of FIG. 18A, the radii 141A, 141B are approximately one quarter of the wall thickness 82A, 82B. The base width 143 is preferably at least half the thickness of the wall thicknesses 82A, 82B, thus giving a tapered cantilever effect to the steps 134A, 134B. In the preferred embodiment, the radii 141A, 141B are at least 0.015 inches and are preferably 0.025 inches.

Referring to FIGS. 19A–19E, the engagement region 76 of the single step Spool 15 of FIGS. 3–4 is illustrated in detail. The features illustrated in FIGS. 19A–19E are critical to the construction of the single step spool 15, but apply equally well to the multi-step spool 11 of FIGS. 1–2.

Figure 19A:
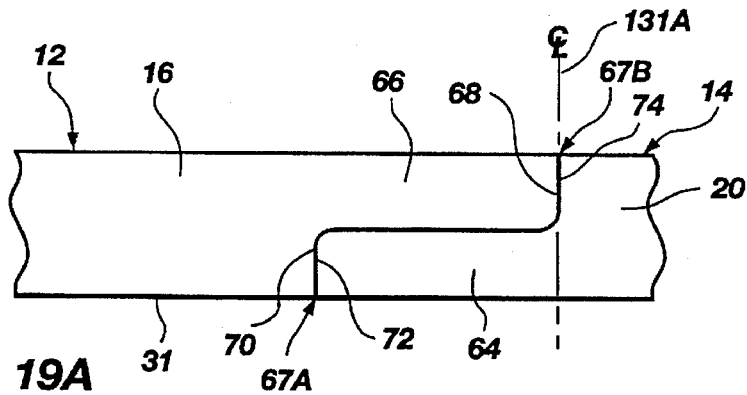
FIGS. 19A and 19B are cross-sectional side elevation views of the engagement region of an improved single-step spool using an offset joint for the assembled tube.
Figure 19B:
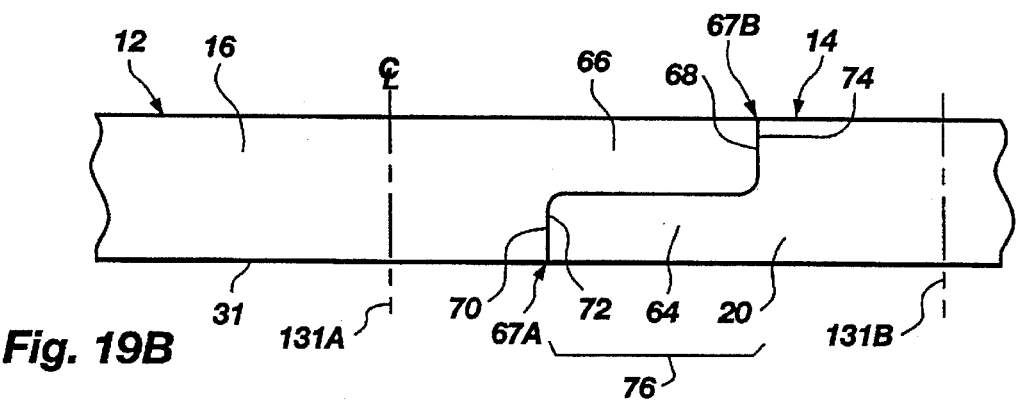

The midline 131A is located approximately halfway between the flanges 18, 22 at the point of maximum moment during a radial drop test in which the spool 10 lands on the rims 34 of the flanges 18, 22. In the embodiment of FIG. 19A, the joint interface 67A is offset to eliminate any possible break in the material between the insert wall 51 and the receiver wall 45 at the outside diameter 17 and the midline. Similarly, the embodiment of FIG. 19B has both joint interfaces 67A and 67B offset from the midline 131A. In the alternative, the midline 131B could be positioned halfway between the flanges 18, 22, thus offsetting both the joint interfaces 67A and 67B from the region of maximum stress (maximum moment), offsetting the joint interface 67A the furthest distance. This offsetting construction is applicable to all stepped joints of the invention.

Figure 19C:
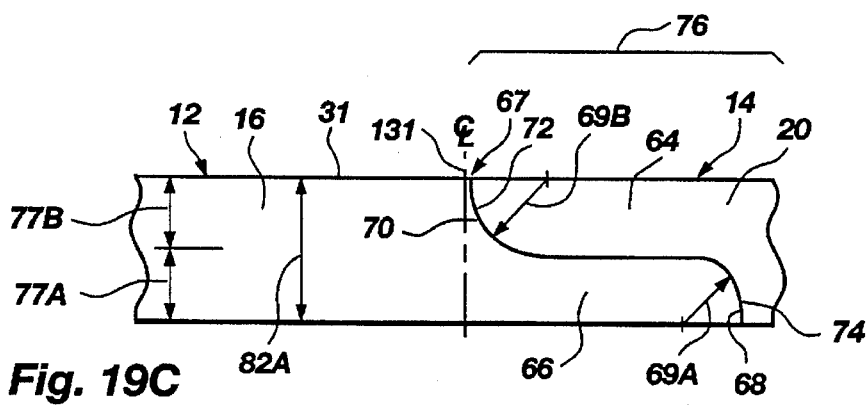
FIG. 19C is a cross-sectional side elevation view of the engagement region of an improved single-step spool using a full-step-thickness radius on step corners.
Figure 19D:
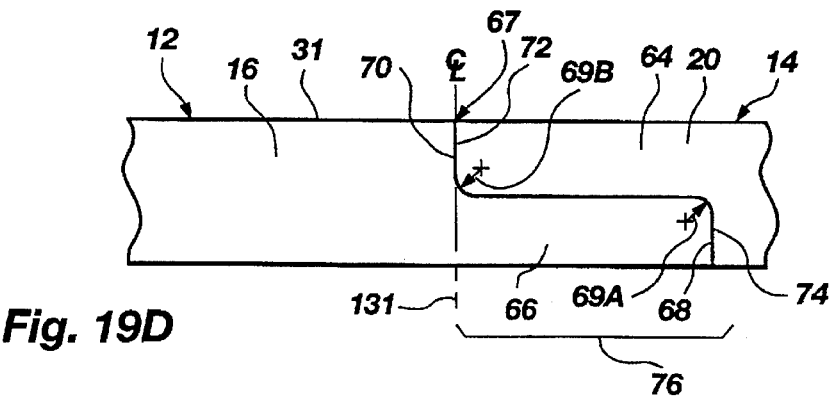
FIG. 19D is a cross-sectional side elevation view of the engagement region of an improved single-step spool using radiused corners on the steps.

In the embodiments of FIGS. 19C and 19D, the radius 69A at the interface between the shoulders 68 and 74 and the radius 69B at the interface between the shoulders 70 and 72 relieves the stress which would result from any sharp corner. In FIG. 19C, the radii 69A, 69B are equal to the shoulder heights 79A, 79B which are themselves preferably equal. In FIG. 19C, the radii 69A, 69B are preferably greater than 0.015 inches, but the shoulders 68, 74 and 70, 72 still fit at right angles to the step surfaces 88A, 88B of the steps 66, 64.

Figure 19E:
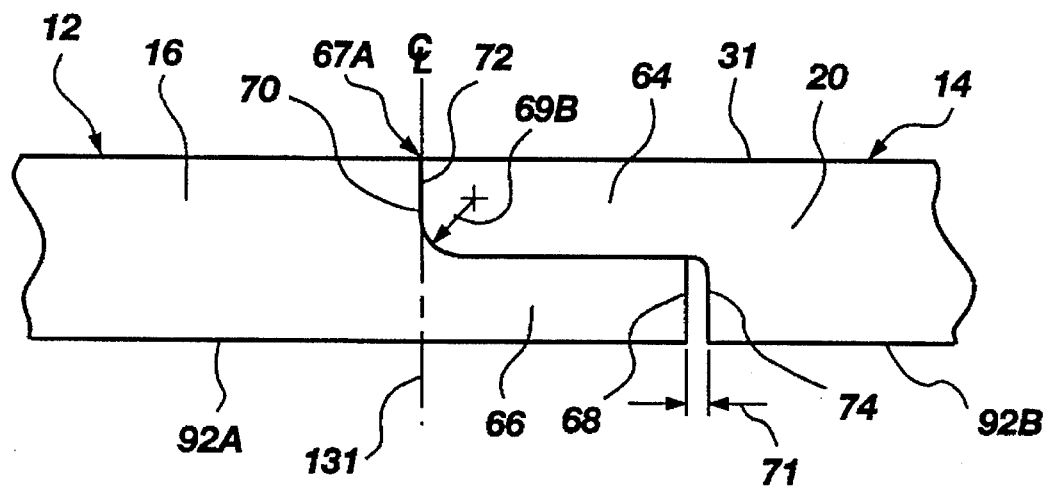
FIG. 19E is a cross-sectional side elevation view of the engagement region of an improved single-step spool using a butt joint on the outermost fiber of the assembled tube.
Figure 20:
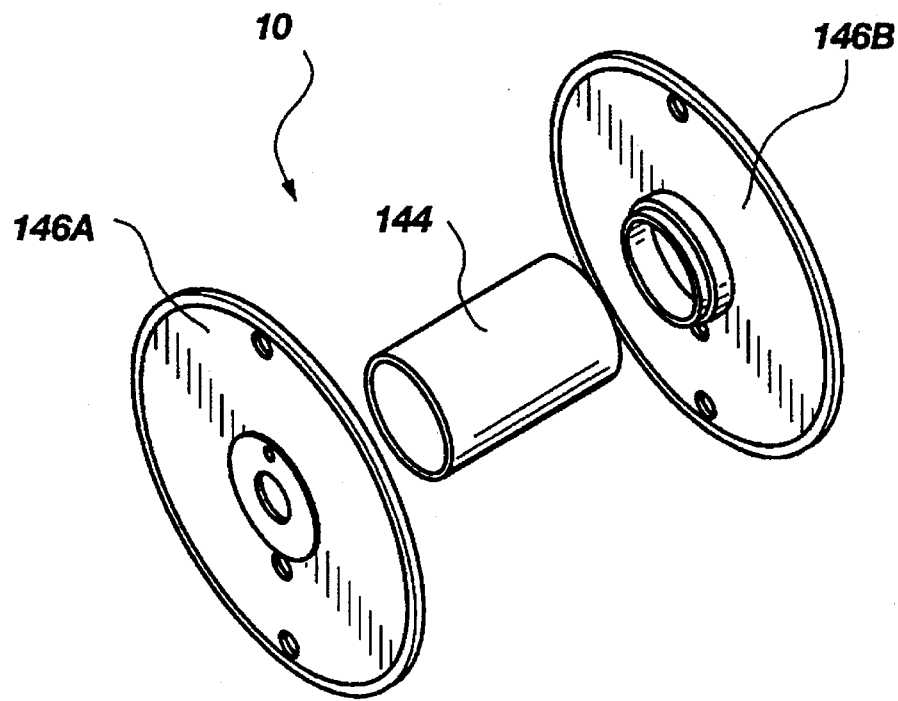
FIG. 20 is an isometric view of the unassembled, three-piece spool of the invention.
Figure 21:
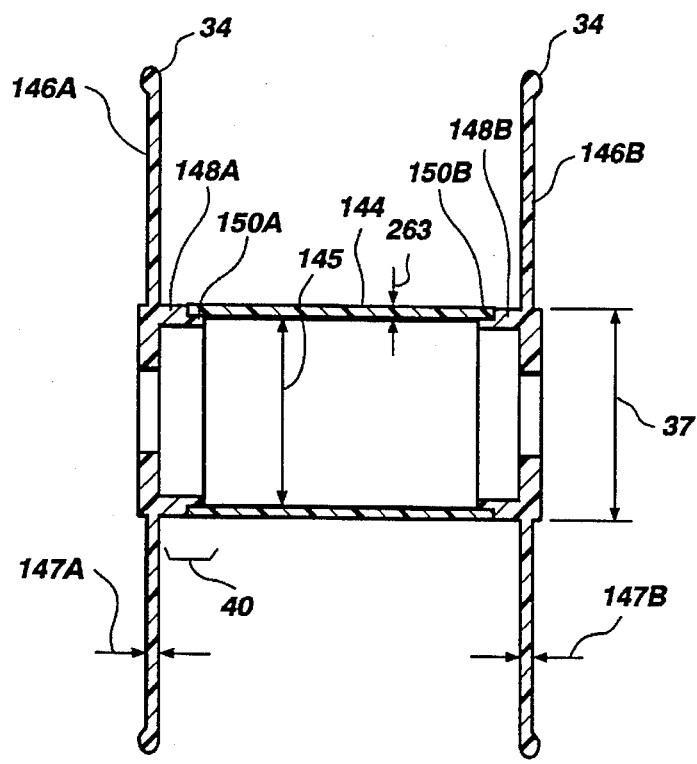
FIGS. 21–22 are cross-sectional elevation views of the three-piece spool of FIG. 20 showing an extruded and a stepped tube, respectively.
Figure 22:
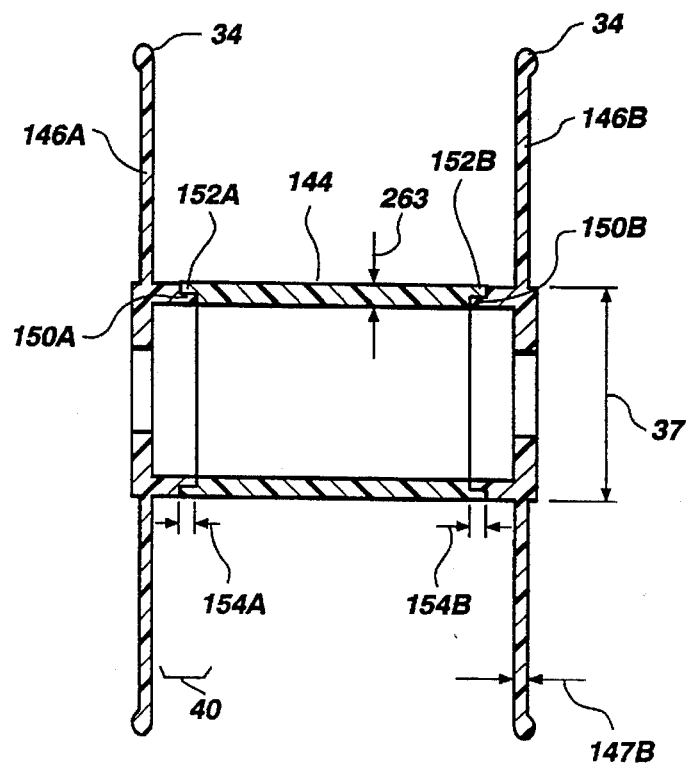

In the embodiment illustrated in FIG. 19E, the clearance 71 between the shoulders 68 and 74 purposely ensures a gap at the inside surfaces 92A, 92B in order that contact is assured between the shoulders 70, 72 at the joint interface 67A. Thus, in this embodiment, the outermost surface 31 of the tube 29 has no discontinuities to subject the tube 29 to stress concentrations or reduced cross-sectional area when loaded during field use or testing.

An alternative embodiment for a spool 10 is the three piece spool of FIGS. 20–23D. The configurations of FIGS. 24A, 24B apply to three-piece and two-piece spools. In this embodiment, a tube 144 is formed either by extrusion or by molding to be fitted to a flange 146A, 146B on either end. The flanges 146A, 146B are preferably identical having a thickness 147A, 147B respectively in other dimensions corresponding to the embodiments of FIGS. 1–4.

The flanges 146A, 146B each have formed thereon a stub tube 148A, 148B, respectively. In one embodiment, the steps 150A, 150B are formed in the stub tube 148A, 148B, respectively, to receive the tube 144 at its inside diameter 145. The stub tubes 148A, 148B are bonded to the ends of the tube 144 by the methods described above.

In an alternative embodiment, preferable in many respects, but requiring a molded tube 144, the tube steps 152A, 152B are formed in the ends of the tube 144. In this way, the bonding method of the multi-step spool 11 can be used. However, a single tube step 152A, 152B is shown in each of the ends of the tube 144. Multiple steps can be formed in a molded tube 144 or cut into an extruded one.

The step widths 154A, 154B in the tube 144 need to have sufficient bearing surface as described above with respect to the FIGS. 1–4. A step width 154A, 154B of one-half inch is preferred. The bonding methods and stepping concepts apply to the three-piece configurations.

Figure 23A:
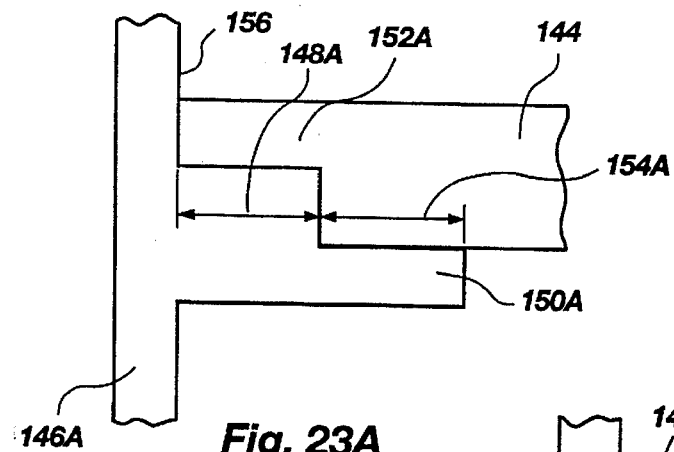
FIG. 23A–23D are detailed cross-sectional side elevation views of the engagement region of an improved three-piece spool of the invention.
Figure 23B:
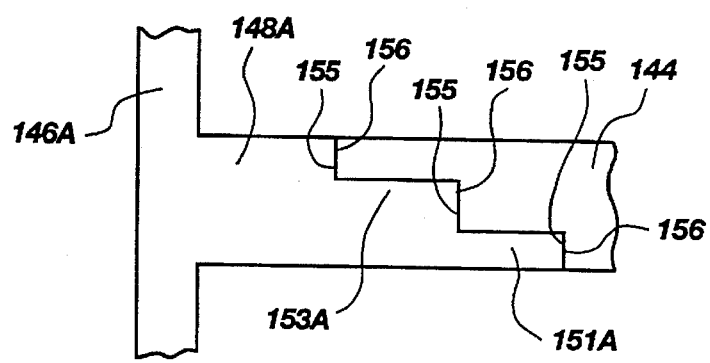

FIGS. 23A–23D illustrate the details of the engagement region 40 of the spool 10. In the embodiment of FIG. 23A, a butt joint 156 connects the flange 146A to the tube 144 by one of the bonding methods discussed, completely covering the stub tube 148A. The stub tube 148A is stepped as discussed above to have the step 150A inside the tube 144 while the tube is also cut or molded to have a step 152A. The configuration of FIG. 23B illustrates multiple steps 151A, 153A defined by the shoulders 155 abutting the shoulders 156 of the tube 144 formed and sized as discussed.

Figure 23C:
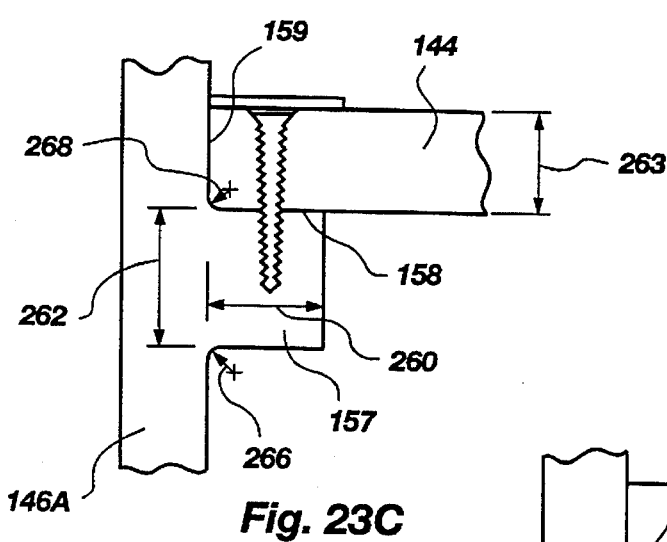
Figure 23D:
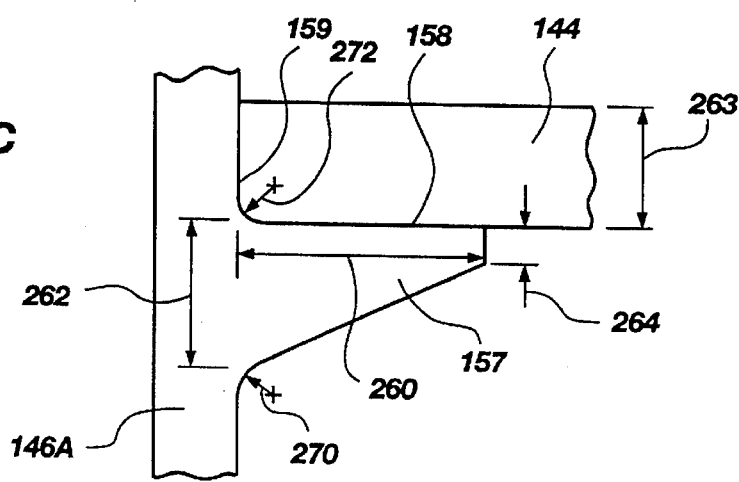

In the illustrated embodiments of FIGS. 23C–23D, a support sleeve 157 replaces the stub tube 148A. This construction is ideal for tubes 144 of paperboard that are strong, inexpensive and can be cut to any length. The width 260 is preferably at least one tenth of the outside tube diameter 37 (see FIGS. 2, 4, 21, 22), while the thickness 262 is approximately equal to the tube wall thickness 263 for plastic tubes 144, and depends on the material of which the tube 144 is made. The tube 144 and the stub tube 156 or support sleeve 157 should effectively be matched to have equal shear strength. That is, the tube 144 may be plastic, metal, rolled sheet metal or paperboard. Each material has manufacturing and structural advantages as discussed herein, particularly for the three-piece configuration shown in FIGS. 23C and 23D.

The buttressed support sleeve of FIG. 23D narrows to a thickness 264 away from the flange 146A further reducing stress discontinuities which result from precipitous changes in cross-sections of materials, such as in the embodiment of FIG. 23C. However the radii 266, 268 in FIG. 23C and radii 270, 272 of FIG. 23D are all greater than 0.015 inches for a tube diameter 37 of 2 inches and a wall thickness 263 of 0.105 inches. Larger radii 266, 268, 270, 272 of approximately one quarter of the thickness 263 of the tube 144 are preferred. One quarter of the thickness 262 of the support sleeve is an alternative baseline dimension where the thickness 262 exceeds the tube thickness 263. The length 260 should be greater than four times the tube thickness 263 and greater than four times the thickness 262. However, one quarter of the tube diameter 37 is preferred for the length 260 in most embodiments.

Figure 24A:
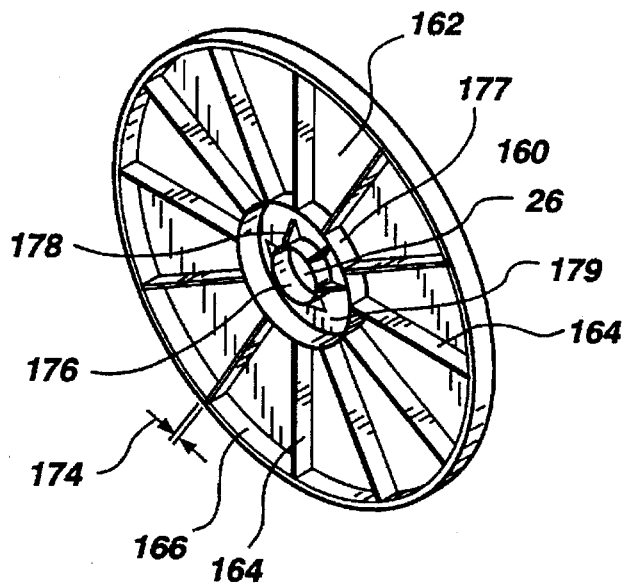
FIG. 24A is an isometric view of a ribbed flange of the invention.
Figure 24B:
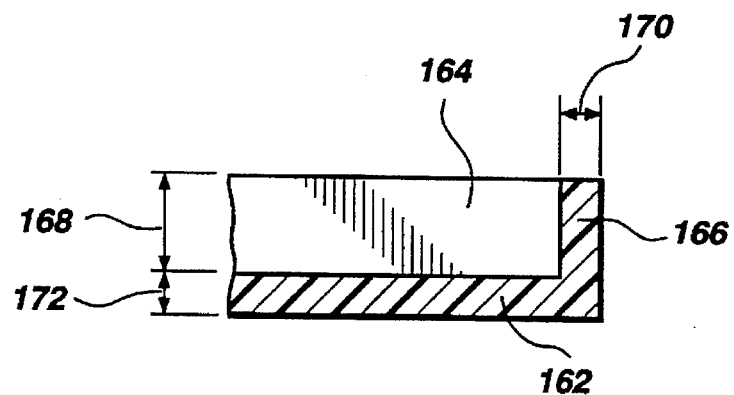
FIG. 24B is a partial, cross-sectional elevation view of the flange of FIG. 23.

FIGS. 24A and 24B show another improvement over the spools of the prior art by including a ribbed flanged 160. The ribbed flange contains a back plate 162 on which are formed ribs 164 protruding normal thereto and extending radially thereacross. A rim 166 is formed of the same material of dimensions similar to those of the ribs 164. The rim height 168 corresponds to a similar dimension of the rim 166 in the embodiment shown in FIG. 24B. The thicknesses 170, 172 and 174 in the preferred embodiment are of the same dimensions, approximately 0.040 to 0.100 inches. Although the thickness of the rim 170 may be optimized to be somewhat different than the thickness 172 of the wall or the thickness 174 of the ribs, molding technology will generally dictate equal thicknesses of all walls for purposes of uniform cooling and proper molding times at all points. That is, variations in thickness tend to increase mold waiting (cooling) times and give parts which are inconsistent at various locations.

An arbor sleeve 176 is provided around the arbor aperture 126 required of all spools 10. Each rib 164 is preferably connected to an inner rim 177 spaced from the arbor sleeve 176 and runs radially to connect to the rim 166 and to the outer circumference of the flange 18, 22 of the spool 10. In a preferred embodiment, gussets 178 are formed to stabilize the end plate 179 and the arbor sleeve 176 with respect to one another.

An alternate embodiment of the invention is the reel 180 illustrated in FIGS. 25–36. The reel is formed to rotate about an axis 181 when receiving a stranded product or when dispensing the same. The reel 180 is formed with a tube 182 having a length 183. The tube 182 is typically formed of a plastic, wound and laminated paperboard, or a rolled or extruded metal. At each end of the tube 182 is attached a flange 184.

Figure 26:
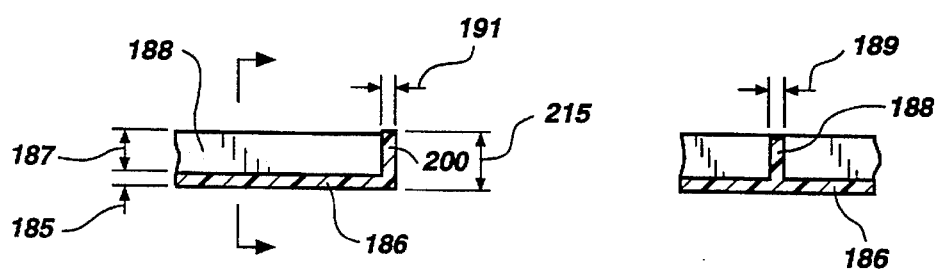
FIGS. 26 and 27 are cutaway, partial, cross-sectional views of the ribs and rim of the flange of FIG. 25.
Figure 27:
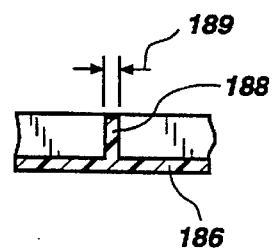

The flange 184 has a thickness 185 across its back plate 186. To the back plate 186 are integrally formed the ribs 188 having a height 187 and a thickness 189. As illustrated in FIGS. 26–27, around the periphery of each of the flanges 184 is attached a rim 190 having a thickness 191. In the preferred embodiment, the thicknesses 185, 189 and 191 are all equal. As discussed above, mold design and the manufacturing cycle times are dependent on the thickness of each section.

In the preferred embodiment, a support sleeve 192 is molded to the flange 184, and integrally a part thereof of to fit inside the tube 182. Inside the center of the support sleeve 192 is the arbor sleeve 194, concentric with and surrounding an arbor aperture 196. The ribs 198 extend radially between the arbor sleeve 194 and the support sleeve 192.

The outside diameter 200 of the tube 182 and the inside surface 240 defined a wall thickness 204 as illustrated in FIGS. 28–30. A channel 210 is formed by a channel wall 212 formed outside the outside diameter 200 of the tube 182. The support sleeve 192 forms the opposite side of the channel 210. The ends of the tube 182 fit into the channel 210 in each flange 184, abutting the end plate 214 in each instance.

In the preferred embodiment, the length 216 of the support sleeve 192 is approximately as shown in FIG. 29. Nevertheless, for structural integrity rather than the manufacturability criteria, the extended length 217 shown in FIG. 30 is preferable. That is, the length 216 is easier to manufacture and is approximately twice the flange thickness 215 or more. By contrast, the extended length 217 is approximately three to four times the flange thickness 215 and extends approximately one to two inches into the tube 182 of a 12 inch diameter reel.

A fundamental purpose of the panel wall 212 is the provision of a location outside the flange 184 for securely fastening the flange 184 to the tube 182. That is, additional operations and risks arise from any fastening technology which touches the tube 182 between the respective back plates 186 at either end of the tube 182. In the apparatus of the invention, a staple 218 or a screw 220 may penetrate the channel wall 212 and the tube 182. In the preferred embodiment, a fastener such as a screw 220 or staple 218 penetrates into the support sleeve 192, further reducing or preventing any tearing or breakage by the tube 182. Depending on the nature of the material from which the flanges 184 are manufactured, a glue 222 can be applied as shown in FIG. 30. However, when the preferred materials from the olefinic plastics are used, a plastic material is a preferable material for the tube 182. The tube 182 can then be bonded to each of the flanges 184 by the methods discussed above including ultrasonic, spin, hot plate, induction and hot gas welding.

Hot gas welding is the preferred method for welding very large parts. In hot gas welding, a plastic filler rod, preferably of the same base material as the spool 10 or reel 180 is passed through a jet of hot gas, typically nitrogen or air. The hot gas softens the rod which then flows into the area to be joined, melting and bonding the base materials to each other and to the material from the filler rod.

Figure 25:
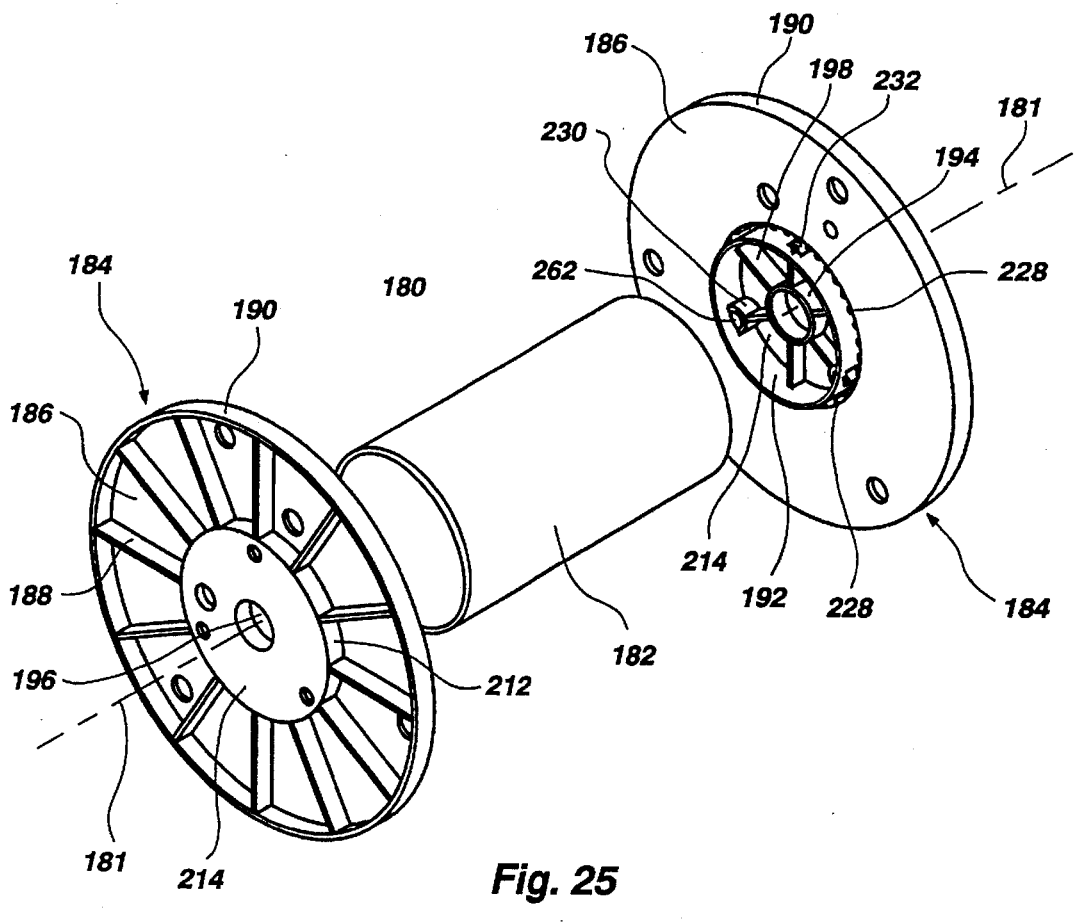
FIG. 25 is an isometric view of an unassembled reel of the invention.
Figure 31A:
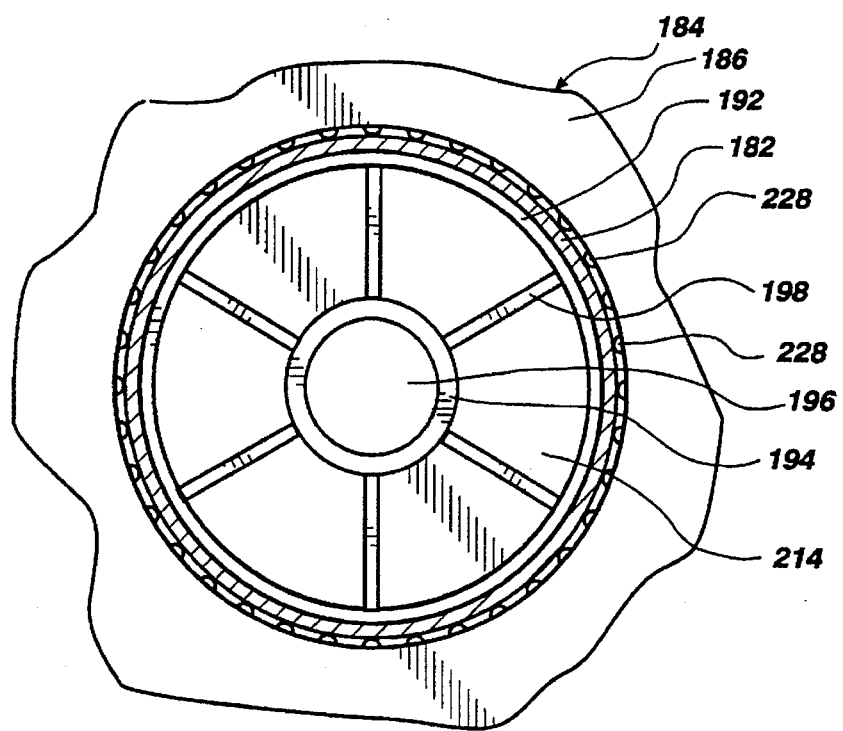
FIG. 31A is a partial detailed elevation view of the support sleeve and channel region of the flange of the reel of FIG. 25.
Figure 31B:
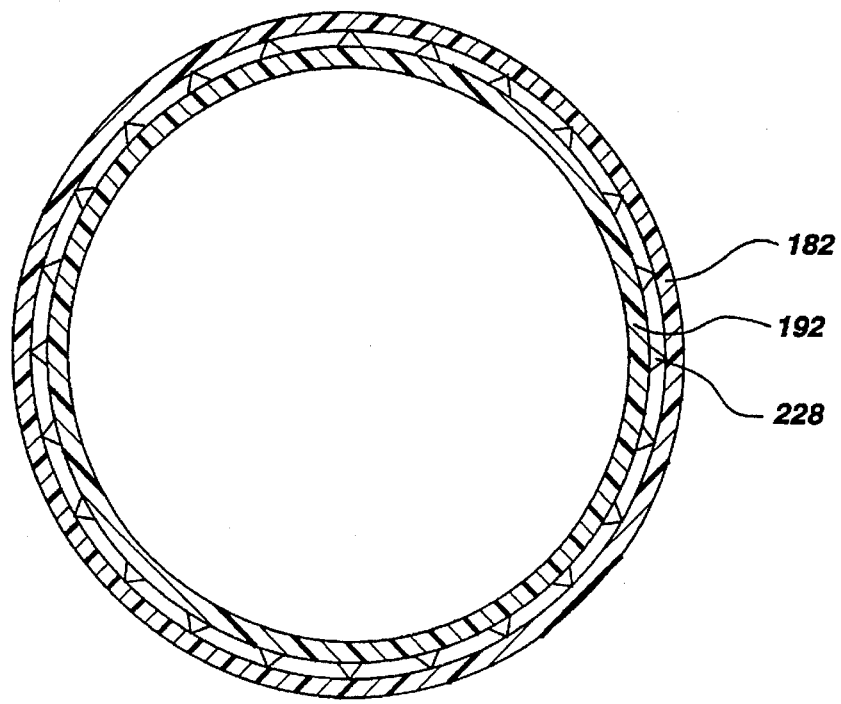
FIG. 31B is a cross-sectional end elevation view of the support sleeve and tube with splines arranged on the outer surface of the support sleeve to contact the inside surface of the tube.

The apertures 224, 226 are formed for various purposes including inspection, connection by a drive mechanism and so forth as discussed for apertures on the spools 10 above. In addition, however, the splines 228 are preferably molded on the channel wall 212 as shown in FIGS. 25 and 31A–31B. These splines 228 provide both resilience and a certain amount of strain while also providing a high load in a localized area to grip the tube 182 inside the channel 210. Splines may also be molded as part of the support sleeve 192 as described above. Since extrusion produces more accurate outside dimensions, generally, for plastic tubes 182, and wrapping around a mandrel produces more accurate inside dimensions for paperboard tubes 182, splines 228 are preferably formed to contact the least accurate surface of a tube 182, whatever its material. Thus, splines 228 are located as shown on the channel wall 212 in FIG. 31A and on the support sleeve 192 in FIG. 31B, according to the configuration of the tube 182.

Figure 32:
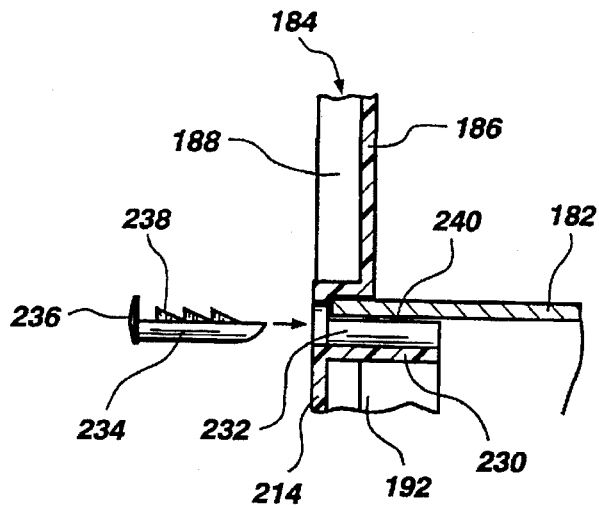
FIGS. 32–34 are partial detailed elevation views of the support sleeve and securing mechanisms in the channel region of the flange of FIG. 28.
Figure 33:
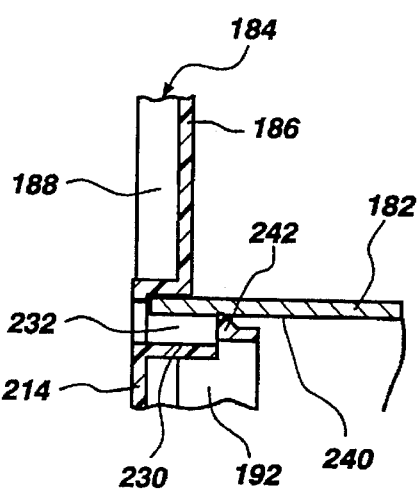
Figure 34:
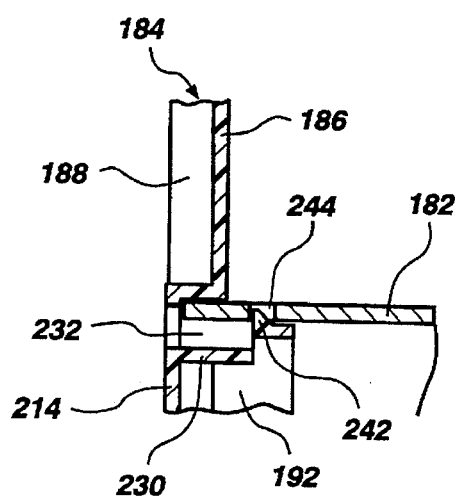

In the preferred embodiment, a receptacle 230 is formed in the support sleeve 192 as shown in FIGS. 25, 32 and 34. The resulting aperture 232 is sized to receive a pin 234. The pin 234 preferably has a head 236 and a row of barbs 238. The head 236 permits driving of the pin 234 into the aperture 232 of the receptacle 230. In addition, the head 236 prevents driving of the pin 234 too far.

The barb 238 serves the purpose of locking the pin 234 into the aperture 232 by applying very localized loading on the inside surface 240 of the tube 182. In an alternate embodiment, a barb 242 may be formed directly on the support sleeve 192 at a plurality of positions around the circumference of the support sleeve 192. Each of the barbs 242 then likewise applies a very large, focused load on the inside surface 240 of the tube 182.

A variation on the use of the barb 242 is an aperture 244 formed in the tube 182 for receiving the barb 242. Thus, rather than relying on friction or deflection or on cutting or gouging a cardboard tube 182, a plastic or cardboard tube 182 could benefit from a positive locking effect of the aperture 244 holding the barb 242 therein.

Figure 35:
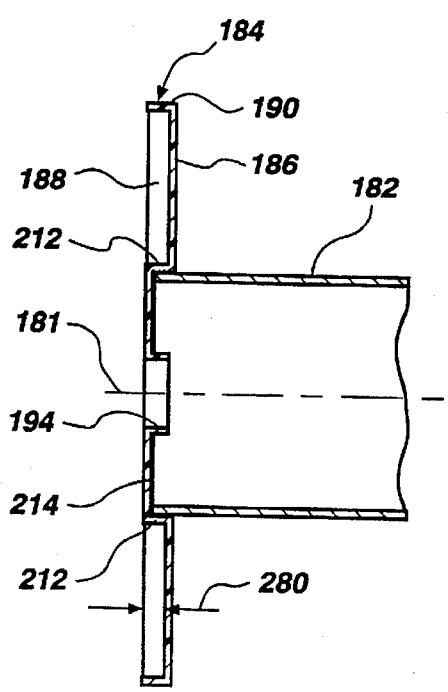
FIG. 35 is a partial, cross-sectional elevation view of an alternate embodiment of a flange on the reel of the invention.
Figure 36:
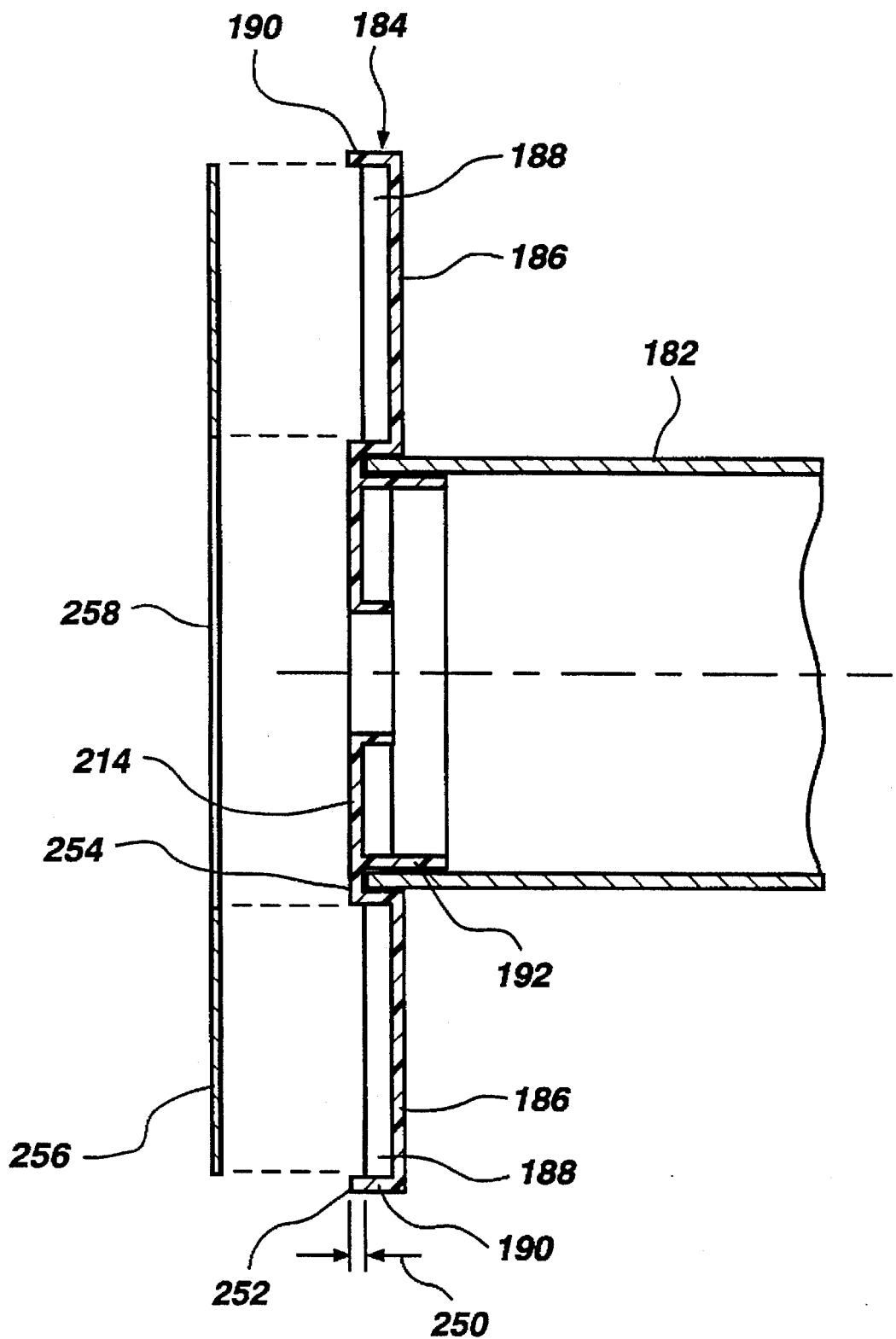
FIG. 36 is a partial, cross-sectional elevation view of a recessed end of a flange on the reel of the invention.

FIG. 35 shows an alternate embodiment which permits the use of fasteners such as the screw 220 and the staple 218, but lack a support sleeve 292. This is a very economical construction with a minimum of mold manufacturing complexity. However, the configuration of FIG. 35 does not have the benefit of the length 216 or the extended length 217 of the embodiment of FIGS. 25–34.

In one embodiment, the flange 184 is configured to provide a relief distance 250 between the edge 252 of the rim 190 and the ribs 188. Likewise, the outer surface 254 of the end plate 214 is positioned axially at the same approximate distance as the edge 252 of the rim 190. A label 256 is configured with an aperture 258 to fit around the end plate 214. Thus, the label 256 fits within the relief distance 250. The benefit of this configuration is that stacking, and otherwise using the reels 180 and spools 10, need not destroy the labels 256 placed on the end thereof. Clearly, the relief distance 250 may be manufactured in the spools of FIG. 24A, and manufactured to be used in any of the disclosed embodiments.

The examples of spools 10, 11 and 15 and the reels 180 are illustrative of sizes standardized within the wire industry. Nevertheless, the manufacturing techniques discussed and the configurations illustrated apply to very large and small sizes for the applications discussed. For example, the spools 10 may be manufactured by rotomolding, also called tumble molding in a low-pressure cavity tumbled on a gimbal to coat the inside surfaces of the cavity evenly with melting resin granules. The resulting insert and receiver can be assembled by any method discussed, but most economically by hot gas welding. Similarly, the reel 180 can be manufactured in sizes requiring less than a 12 inch flange diameter, but may be rotomolded in 4, 6 and 8 foot flange diameters. Moreover, the ribs 186 may be structured to run radially and circumferentially, crossing each other, adding stiffness to support larger flange sizes. Honeycombed lattices of ribs 186 are also within contemplation, to facilitate reduced rib thicknesses 189 in very large reels 180. Although a single spool or reel could be rotomolded in a very large size, the constructions shown require far smaller tooling, permit a variety of sizes of the tubes 29, 144, 182, particularly in length. However, the channel walls 212 can be made in multiple sizes on a single flange 184. Changes in the length 183 can be accommodated in manufacture of the tubes 23, 144, 182. Multiple potential diameter 200 of the tubes 182 can also be accommodated. The support sleeves 192 are made to extend only flush with the backplate 186, but are molded at several diameters on a single flange 184. By suitable choice of the setback distance 280 on the flange 184, the length 216 of the support sleeve 192 still provides adequate bearing surface to stably support the tube 182.

The preferred tube in the wire industry is a right circular cylinder on a circular flange, but perforated, slatted, axially segmented, diametrally segmented, assembled box shaped, rectangular, hexagonal or other polygonal tubes and flanges are within contemplation. Likewise, automatic starting holes for wire may be made, penetrating the tube portion of any spool or reel may be made by drilling or may be molded into the parts to leave the proper penetration after assembly.

To recycle the spools 10 or reels 180, the plastic parts may be disassembled at the use site. Even a reel 8 feet in diameter could be cut up by any saw, including a chain saw, saber saw, circular saw or the like. Thus the volume can be substantially reduced for recycling. Polyolefins have the advantage that they do not lose any substantial portion of their mechanical and molding properties when recycled.

The embodiments disclosed are illustrative only. Obvious variations of the invention will be apparent to those skilled in the art. Therefore, the embodiments illustrated do not serve to limit the invention which is limited only by the claims hereinafter set forth.

What is claimed and desired to be secured by United States Letters Patent is:

1. A reel comprising:
   a first flange, homogeneously molded of a first material, and having a first face on an inward side thereof;
   a second flange, homogeneously molded of the first material, and having a second face on an inward side thereof, facing and spaced axially from the first face;
   a tubular segment, formed of a second material different from the first material, and connected to extend from the first face to the second face at a substantially uniform diameter, the tubular segment having a first end and a second end fixedly fastened to the first flange and the second flange, respectively, to resist an axial force urging apart the first flange and second flange; and
   the first and second flanges each having a sleeve homogeneously molded therewith and extending axially from the respective first and second faces to receive therealong in an axial direction the first and second ends, respectively, at substantially the uniform diameter, the first and second faces being substantially planar between the tubular segment and an outer circumference of the respective first and second flanges.

2. The reel of claim 1, further comprising a fastener positioned to extend radially between the tube and the sleeve.

3. The reel of claim 1, wherein each of the sleeves extends into the tubular segment.

4. The reel of claim 1, wherein the tubular segment extends into each of the sleeves.

5. The reel of claim 1, wherein the uniform diameter is an outer diameter uniform between the first and second faces.

6. The reel of claim 1, wherein the first flange further comprises ribs attached at inner edges thereof to a back face opposite the first face to extend between an inner rim and an outer rim, the inner rim and outer rim extending axially from the back face to a distance beyond the ribs for protecting a label attached to the outer edges of the ribs.

7. The reel of claim 1 wherein each of the first flange and the second flange is further comprised of ribs molded thereto, having a thickness and extending axially a width away therefrom for increasing the stiffness of said respective first and second flange, the ratio of the width to the thickness being about 5 or more.

8. The reel of claim 7 wherein the ratio is 10 or more.

9. A reel comprising:
   a first flange homogeneously molded of a first material to have a first face on an inward side thereof and a first cylindrical sleeve homogeneously molded to extend axially from the first face;
   a second flange homogeneously molded to have a second face on an inward side thereof spaced axially from the first face, and having a second cylindrical sleeve homogeneously molded to extend axially from the second face;
   a tube of a second, different material secured proximate a first end thereof to the first cylindrical sleeve and proximate a second end thereof to the second cylindrical sleeve, the tube extending from the first face to the second face and fastened to the respective first and second flanges to support an axial force urging apart the first flange and second flange; and
   the first and second faces being substantially planar between the tube and an outer circumference of the respective first and second flange.

10. The reel of claim 9 wherein the first cylindrical sleeve and second cylindrical sleeve extend axially toward the second flange and first flange, respectively.

11. The reel of claim 9 wherein the first cylindrical sleeve and second cylindrical sleeve extend axially away from the second flange and first flange, respectively.

12. The reel of claim 11 wherein the first cylindrical sleeve and second cylindrical sleeve extend axially toward the second flange and first flange, respectively.

13. The reel of claim 9 wherein the first end and second end are glued to the first and second cylindrical sleeves, respectively.

14. The reel of claim 9 wherein the first and second ends are connected to the first and second flanges, respectively, by a first fastener proximate the first end and a second fastener proximate the second end respectively.

15. The reel of claim 14 wherein the first fastener extends radially between the first end and the first cylindrical sleeve, and the second fastener extends radially between the second end and the second cylindrical sleeve.

16. The reel of claim 9 wherein the first end and second end of the tube are glued to the first and second faces, respectively.

17. The reel of claim 9 wherein the first sleeve forms a first channel extending axially into the first face, and the second sleeve forms a second channel extending axially into the second face.

18. The reel of claim 9, wherein the first and second sleeves are homogeneously molded with the respective first and second flanges.

19. The reel of claim 9, wherein the first and second sleeves extend into the tube.

20. The reel of claim 9, wherein the tube extends into each of the sleeves.

21. The reel of claim 9, wherein the first flange further comprises ribs attached at inner edges thereof to a back face opposite the first face to extend between an inner rim and an outer rim, the inner rim and outer rim extending axially from the back face to beyond the ribs.

22. The reel of claim 9 wherein each of the first flange and the second flange is further comprised of ribs molded thereto, having a thickness and extending axially a width away therefrom for increasing the stiffness of said respective first and second flange, an aspect ratio of the width to the thickness being about 5 or more.

23. The reel of claim 22 wherein the aspect ratio is about 10 or more.

24. A reel comprising:

a first flange having a first face on an inward side thereof;

a second flange, having a second face on an inward side thereof, facing and spaced axially from the first face, the first and second flanges being formed of a first material;

a tube secured between the first flange and second flange to support an axial force urging apart the first flange and second flange; and first and second cylindrical sleeves homogeneously molded with and extending axially from the respective first and second faces to axially receive, enclosed away from the first and second faces, first and second ends, respectively, of the tube;

a first fastener extending radially between the first cylindrical sleeve and tube to extend into a wall of the tube, securing the first cylindrical sleeve to the tube proximate the first end; and a second fastener extending radially between the second cylindrical sleeve and the tube to extend into a wall of the tube, securing the second cylindrical sleeve to the tube proximate the second end.

* * * * *

UNITED STATES PATENT AND TRADEMARK OFFICE
CERTIFICATE OF CORRECTION

PATENT NO.   :   5,660,354

DATED        :   August 26, 1997

INVENTOR(S)  :   Ripplinger

It is certified that error appears in the above-identified patent and that said Letters Patent is hereby corrected as shown below:

In column 1, line 57, after the word "most", please delete --.-- (punctuation period).
In column 5, line 7, please delete "my", and insert therefor --may--.
In column 7, line 13, please delete "Using", and insert therefor -- using --.
In column 10, line 49, please delete "Surface", and insert therefor -- surface --.
In column 22, line 48, after the word "thereof", please insert --,-- (punctuation comma).

Signed and Sealed this

Eighteenth Day of November 1997

Attest:

BRUCE LEHMAN

Attesting Officer

Commissioner of Patents and Trademarks